United States Patent [19]

Hertrich et al.

[11] 4,390,912
[45] Jun. 28, 1983

[54] TRANSDUCER POSITIONING SYSTEM AND DATA DISK THEREFOR

[75] Inventors: Friedrich R. Hertrich; Slobodan R. Perera, both of Boulder, Colo.

[73] Assignee: Digital Equipment Corporation, Maynard, Mass.

[21] Appl. No.: 206,008

[22] Filed: Nov. 12, 1980

[51] Int. Cl.³ .................. G11B 21/08; G11B 21/10
[52] U.S. Cl. ............................... 360/78; 360/77
[58] Field of Search ................ 360/78, 77, 75, 51, 360/135

[56] References Cited

U.S. PATENT DOCUMENTS

| | | | |
|---|---|---|---|
| 3,936,876 | 2/1976 | Taylor | 360/78 |
| 3,994,016 | 11/1976 | Moghadam | 360/77 |
| 4,032,984 | 6/1977 | Kaser et al. | 360/77 |
| 4,048,660 | 9/1977 | Dennison et al. | 360/77 |
| 4,052,741 | 10/1977 | Baca et al. | 360/77 |
| 4,056,830 | 11/1977 | Smith | 360/51 |
| 4,068,267 | 1/1978 | Inouye | 360/75 |
| 4,068,269 | 1/1978 | Commander et al. | 360/78 |
| 4,072,990 | 2/1978 | Case et al. | 360/77 |
| 4,101,942 | 7/1978 | Jacques | 360/77 |
| 4,115,823 | 9/1978 | Commander et al. | 360/77 |
| 4,163,265 | 7/1979 | van Herk | 360/77 |
| 4,188,646 | 2/1980 | Sordello | 360/77 |
| 4,208,679 | 6/1980 | Hertrich | 360/77 |
| 4,297,737 | 10/1981 | Andresen | 360/78 |

FOREIGN PATENT DOCUMENTS 2645620 10/1976 Fed. Rep. of Germany .

OTHER PUBLICATIONS

IBM Tech. Disclosure Bulletin-Servo Positioning of Mag. Head, vol. 13, No. 10, Mar. 1971, p. 3161.
IBM Tech. Disc. Bulletin, vol. 19, No. 7, Dec. 1976, pp. 2686–2687, Measuring and Adjusting Speed of Magnetic Disk Access Arm, p. 2686.

Primary Examiner—Robert M. Kilgore
Attorney, Agent, or Firm—Cesari and McKenna

[57] ABSTRACT

A transducer positioning system and a magnetic disk therefor for use in a disk drive unit of a data processing system. The magnetic disk contains plural servo sectors interposed between a plurality of circumferentially spaced data sectors. Each servo sector contains at least two sets of spaced servo blocks that include first and second asymmetrical, time-displaced, complementary servo information signals located in radially adjacent blocks. Respective sets of data track centerlines are aligned with the phase boundaries of an associated set of servo blocks in the servo sector. The disk drive unit includes a controller that selects one of the servo blocks and use a null detector to position a movable transducer over a data track centerline associated with the set of phase boundaries of the selected servo block. The controller additionally includes a track difference counter responsive to the null detector thereby to count zero crossings of the phase boundaries during movement of the transducer for indicating the displacement between the movable transducer and the desired data track in the data sector and for controlling the movement of the transducer.

9 Claims, 24 Drawing Figures

DATA PROCESSING SYSTEM 10

| MARKER | GET STATUS | SIGN | RESET ERR | HEAD φ | TRACK DIFFERENCE | E1/E2 FOLLOW |

COMMAND WORD

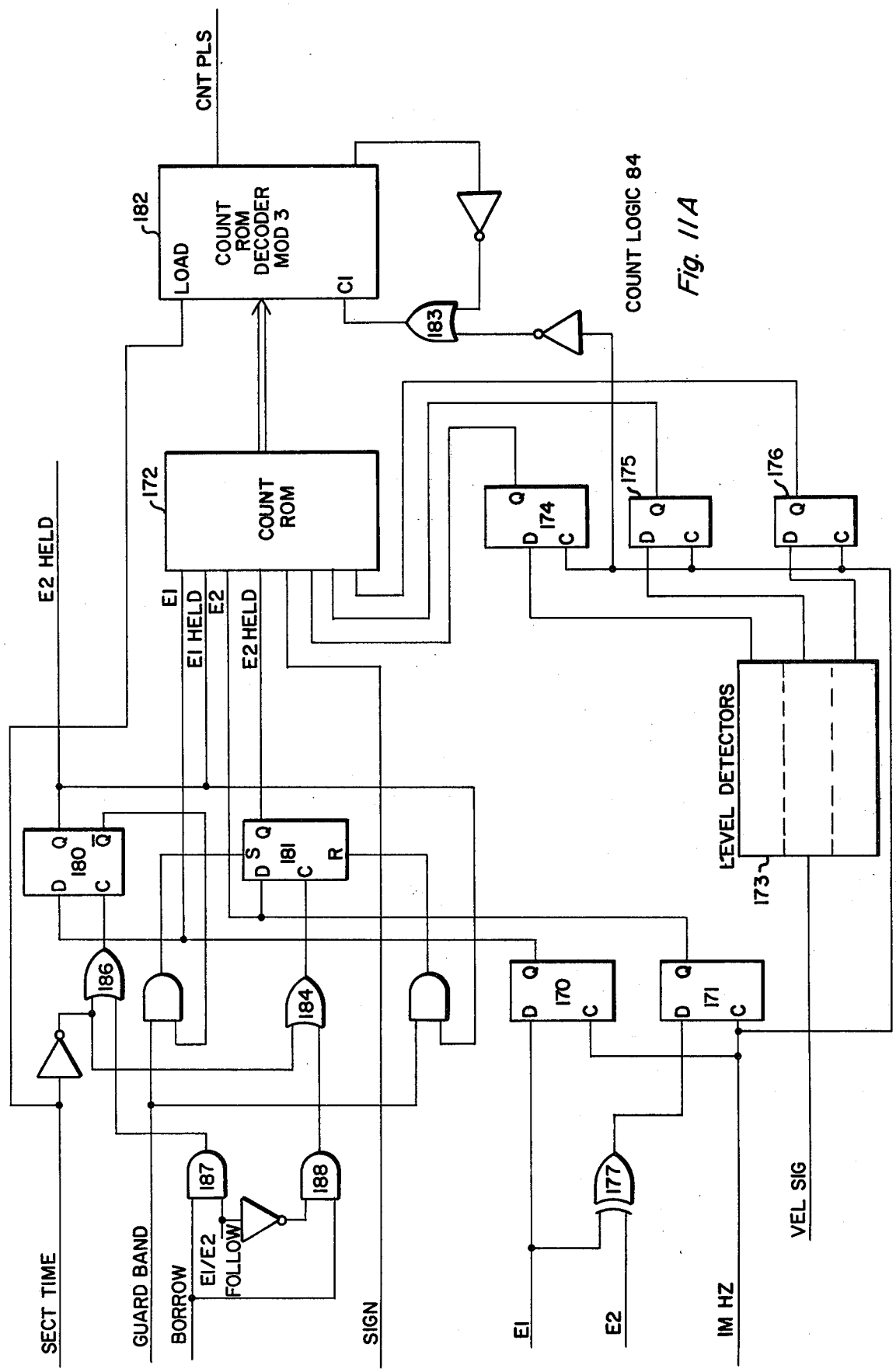

1

TRANSDUCER POSITIONING SYSTEM AND DATA DISK THEREFOR

CROSS-REFERENCE TO RELATED APPLICATIONS

This application is related to U.S. application Ser. No. 882,127 filed Feb. 28, 1978, now U.S. Pat. No. 4,208,679 assigned to the same assignee as this application. All matter disclosed therein is hereby incorporated by reference in this application.

BACKGROUND OF THE INVENTION

The invention relates to magnetic disk drive units for use in data processing systems. More specifically, the invention pertains to magnetic disks including servo positioning information and servo positioning systems for data track seeking and following operations.

A data storage system of the type herein described typically includes a circular magnetic recording and playback medium that rotates on a drive unit, at least one transducer or read/write head for transferring data signals to and from the magnetic medium, and a controller that either selects the transducer that transfers data or moves a positioner that aligns the transducer over a selected data track of the magnetic medium. The controller actuates the positioner which moves the transducer in response to servo data contained on the recording medium. That portion of the recording medium not containing servo positioning data is dedicated to storage information, or processed data, that are generated by the data processing system.

The type of controller employed characterizes the generally known classes of disk storage system, namely, fixed head drive systems and movable head drive systems. In a fixed-head disk drive system, at least one transducer is positioned over the path of each concentric data track, whereas in movable head disk drive systems, a single set of heads is moved by a servo controller from track to track in response to commands from the data processing system. The expense of head duplication in fixed-head systems, in certain applications, is justified because there is no positioning delay, i.e. the delay encountered while the heads are being moved from one track location to another track location. On the other hand, however, where positioning delay is tolerable, the more economical movable head drive systems are desirable provided track seeking and following tasks can be performed accurately and timely while attaining a substantially high track density on the magnetic storage medium.

In movable head system disk systems the data disk used therein contains prerecorded servo data, or positioning information, on the surface of the magnetic recording medium. That servo data may be interleaved with work data on each of the concentric tracks, or all servo data may be contained on a dedicated servo surface of the recording medium while the work data is contained on the remaining surfaces of the recording medium. In a magnetic disk of the former type, servo positioning information can be advantageously read by the same transducer that reads the storage data. The arrangement of the of servo positioning information may be varied according to the particular track seeking and track following algorithm employed by the disk system. One such arrangement is disclosed in U.S. Pat. No. 4,101,990 wherein both servo and storage data are contained on each surface of the disk. A transducer is positioned over a data track centerline by a controller using a null detector that detects null signals generated by boundaries of adjacent plused servo signals of opposite polarity.

In another type of drive system, such as that disclosed by U.S. Pat. No. 4,032,984, coarse positioning data is recorded in one servo sector and fine position data is recorded in another servo sector. The servo controller uses the fine positioning data to follow a designated data track and uses the coarse positioning data to seek a designated data track within a band of several data tracks. During track seeking operations, the servo controller interprets information contained in three distinct and successive cells of a servo sector which provides eight unique location indications within an eight track group. When the transducer is moved to a new track, the information at an initial position is compared with information at a final position. The new track position is then determined by the comparison. The controller then decrements a difference counter in response to this information.

Another servo positioning system, described in IBM Technical Disclosure Bulletin Volume 13, No. 10, March 1971, p. 3161 illustrates servo signals used for positioning a read/write head which can be positioned over a selected data track by employing a secondary head coupled to the read/write head. The secondary, or servo, head generates a position error signal derived from a composite signal dependent upon the position of the servo head with respect to adjacent servo signals which are the inverse of the other shifted in phase by 90°.

SUMMARY OF THE INVENTION

In view of the foregoing, an objective of this invention to provide magnetic disk contain servo positioning information that is suitable for both track seeking and following operations of a disk drive unit.

Another objective of this invention to provide a disk drive unit having a servo positioning system for positioning a movable transducer over a selected data track and for moving the transducer to a preselected data track.

In accordance one aspect of the invention, the magnetic disk of the invention comprises plural circumferentially spaced data sectors that include at least two sets of interleaved data tracks being circumferentially disposed and centered on respective sets of circular track centerlines, plural servo sectors that are positioned between adjacent data sectors and including therebetween at least two sets of circumferentially spaced servo information blocks that contain first and second asymmetrical, time displaced, complementary signals located alternately in radially adjacent blocks such that the phase boundaries of the signals in adjacent blocks are aligned with and thereby define the respective sets of said circular track centerlines, and a sector indicator for indicating the circumferential location of the data sectors and the servo sectors.

In accordance with another aspect of the invention, the disk drive unit comprises a drive spindle for rotating said magnetic disk, movable transducer positioned adjacent a surface of the aforementioned inventive magnetic disk for generating read signals in response to recordings in the servo sectors of the magnetic disk, and a servo controller that is responsive to binary encoded read-signals to position the transducer over a preselected data track in the sector.

These and other aspects, features and advantages of the invention will become apparent upon review of the succeeding specification taken in connection with the accompanying drawings.

BRIEF DESCRIPTION OF THE DRAWINGS

FIG. 11A is a detailed logic diagram of count logic circuit shown in FIG. 3D.

DESCRIPTIONS OF ILLUSTRATIVE EMBODIMENTS

Figure 1:
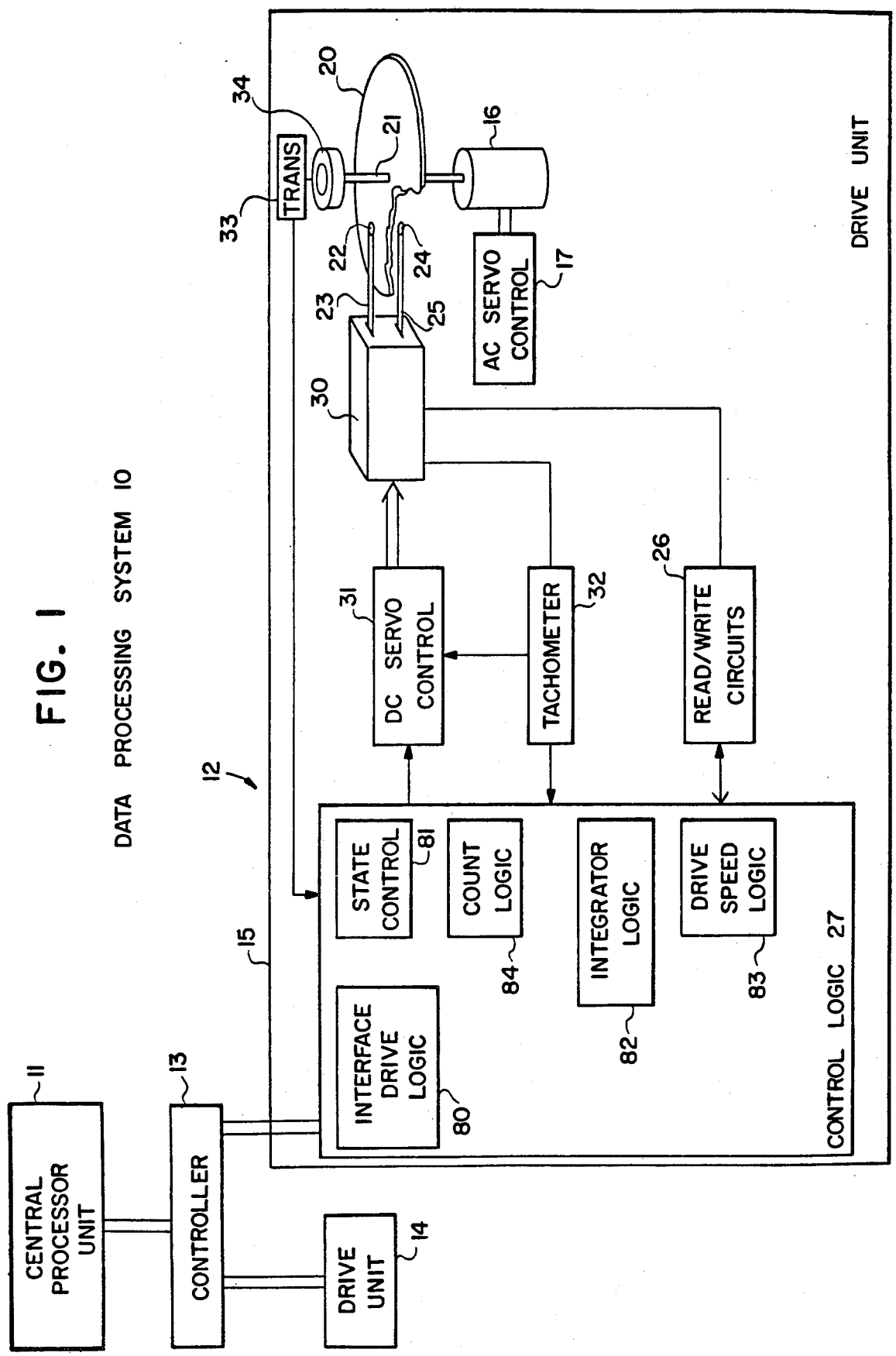
FIG. 1 is a block diagram of a data processing system that incorporates the magnetic disk system constructed in accordance with this invention.

FIG. 1 depicts a data processing system 10 that includes a central processor unit 11 connected to a secondary storage facility 12. Other units such as input/output units form no part of this invention and are not disclosed. The secondary storage facility 12 includes a controller 13 and, in this particular embodiment, a drive unit 14 and a drive unit 15.

Only one drive unit 15 is shown in detail. It includes an AC motor 16 that rotates a magnetic recording medium 20 on a spindle 21, and an AC servo control circuit 17 for controlling AC motor 16. The medium 20 includes a series of concentric tracks for storing work data and servo data in spaced data sectors at each track. In one specific embodiment of this invention, a transducer in a form of an upper read/write head 22 is positioned adjacent the upper surface of the disk 20 by an arm 23. A lower read/write head 24 supported by an arm 25 is disposed adjacent the lower surface of the disk 20. Reading and writing signals are transferred between the heads and the controller 13 through read/write circuits 26 and control logic 27 which connects to the controller 13. The controller 13 and control logic 27 generally use conventional techniques for transferring information to and from the media.

A head positioner 30 moves the heads 22 and 24 from one track to another and centers the heads over a selected track. It may comprise a "voice coil" or other known linear motion device which moves the arms 23 and 25 across the surfaces of the disk 20. The remaining circuitry in FIG. 1 provides two basic functions that are important to this invention. The first is a track seeking function during which the positioner 30 moves the heads 20 and 24 from one track to another. The second is a track following function during which the positioner 30 centers the heads 22 and 24 over a selected data track. Track counting also is performed with the track seeking function. A DC servo control circuit 31, that actuates the positioner 30 during both seeking and following operations, responds to signals from a tachometer 32 and the control logic 27. The tachometer generates signals representing the velocity at which the heads 22 and 24 are radially moving accross data tracks.

Figure 2A:
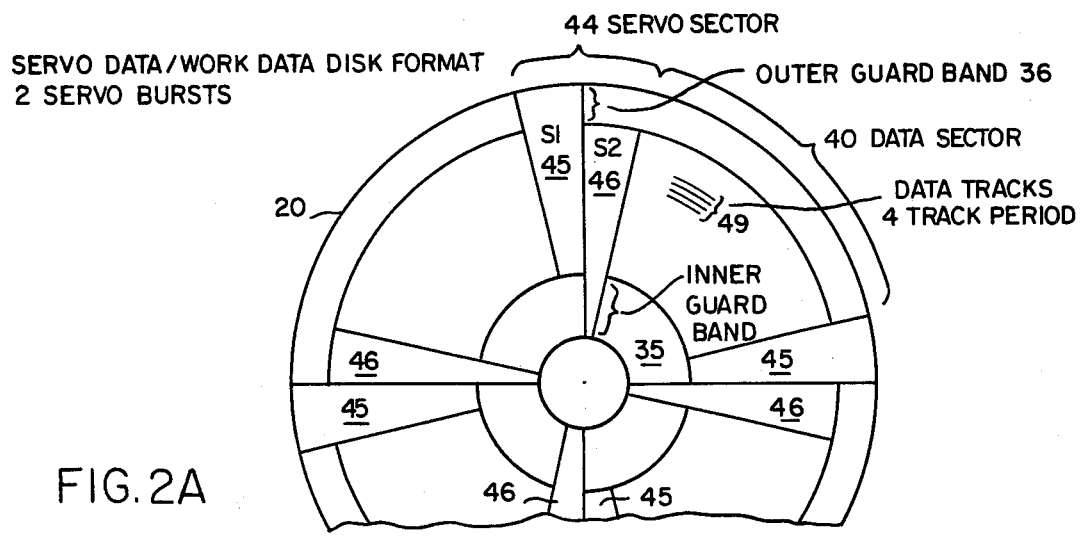
FIGS. 2A, 2B, and 2C show various organizations of servo information blocks disposed on the magnetic storage disk of the invention.
Figure 2B:
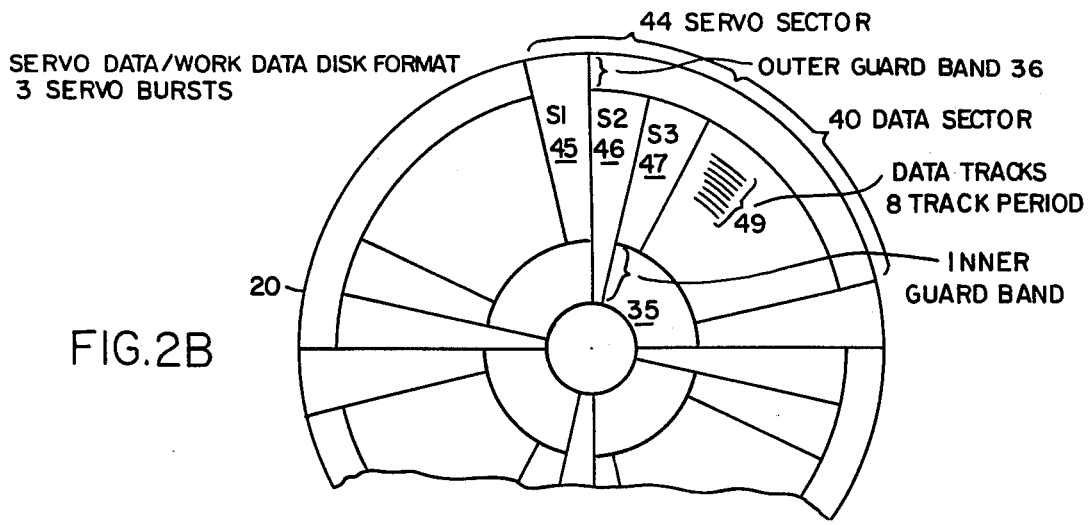
Figure 2C:
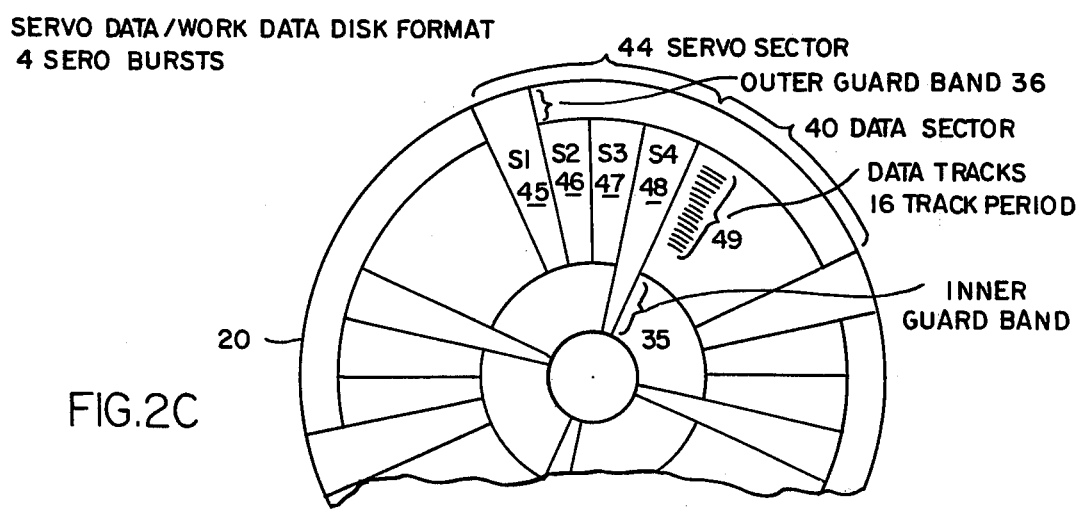

FIGS. 2A, 2B, and 2C show various configurations of servo data blocks. Specifically, FIG. 2A shows a servo sector 44 comprising two areas 45 and 46 which contain the sets of servo information blocks and an area 49 which contain the storage data tracks. The data tracks in area 49 of FIG. 2A have a 4-track period, the significance of which is subsequently described. Likewise, FIGS. 2B and 2C depict a magnetic disk format including three and four servo areas, respectively, and a corresponding storage areas 49 which have 8-track and 16-track periods, respectively. The number of servo areas and track periods described are only illustrative.

Each of the magnetic disks includes an outer guard band 20 and and inner guard band 35 in which servo information signals of a particular polarity are recorded. These signals are used by a servo controller to detect movement of the transducer into these areas. The operation thereof is subsequently discussed.

Figure 2D:
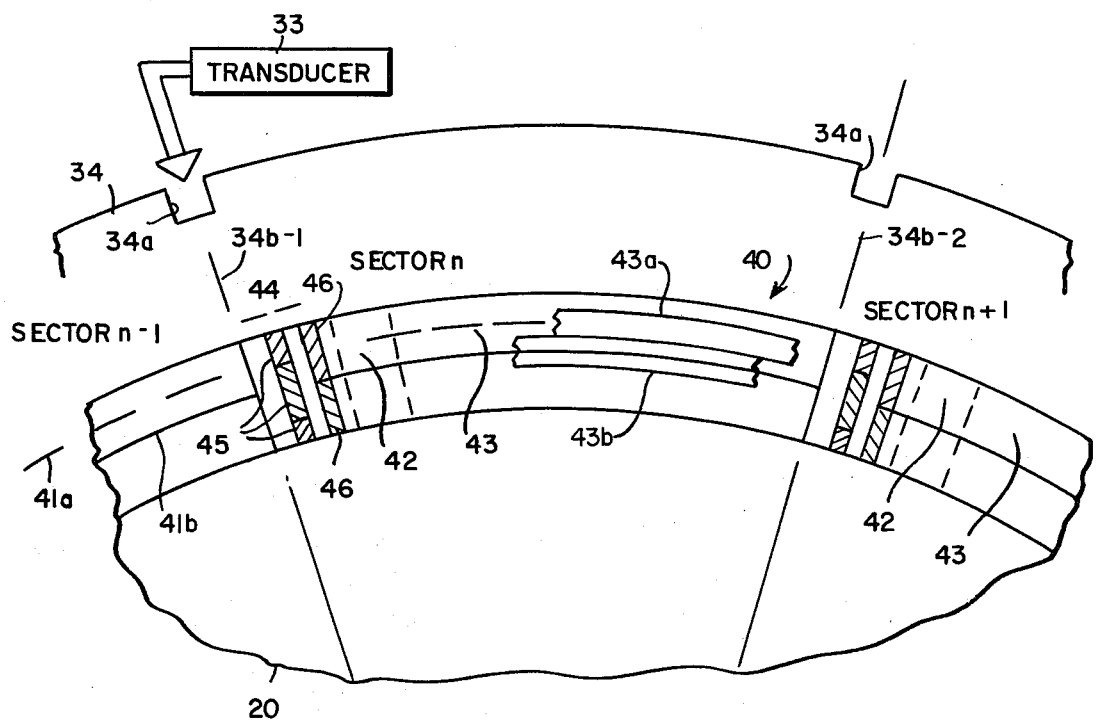
FIG. 2D shows a more detailed arrangement of servo information blocks and storage data contained on an exemplary track of the magnetic disk media of FIG. 2A.

FIG. 2D depicts a portion of the magnetic disk of FIG. 2A. The disks of FIGS. 2B and 2C have similar characteristic, but of course, a greater number of spaced servo information blocks. In FIGS. 1 and 2D, each drive unit includes a transducer 33 and a metallic plate 34 that mounts to the spindle 21. The plate 34 has a plurality of equiangularly spaced notches disposed about its periphery. In one embodiment, each track comprises forty circumferentially spaced data sectors so the angle between adjacent notches 34a is 9°. Radii 34b-1, 34b-2, etc. extend through the centers of the respective notches. Each radius also is aligned approximately with the end of a preceeding data sector. In addition, a first data track (43a) in data sector 43 lie on tracks has a centerline 41a. The first set of track centerlines, one data track 43a being shown aligned with track 41a, is defined by the phase boundaries of complementary servo signals in locations 45. The centerlines of a second set of data tracks in the data sector 43 lie on tracks exemplified by centerlin 41b. The second set of track centerlines, one data track 43b being shown aligned with track 41b, is defined by the phase boundaries of complementary servo signals in locations 46. A block of header information is contained in the area 42. The head block typically includes record number information associated with the succeeding data track.

Figure 2E:
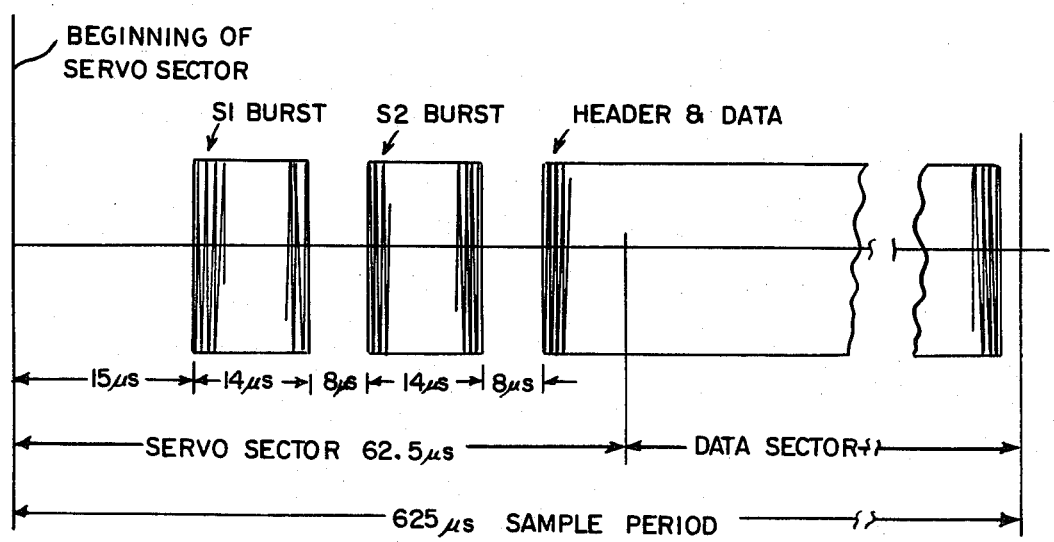
FIG. 2E shows the relative timing of servo and storage information recorded during one sample period.

FIG. 2E shows the relative timing of the various signals produced by a read/write head when passing through a sector. In the previously described example, servo bursts S1 and S2 represent information recorded in blocks 45 and 46 as the disk rotates past the heads. The servo information in each of the blocks S1 and S2 generates positive and or negative signals, respectively, depending upon the radial position of the transducer. Thus, of four unique states can be logically represented by signal pairs of the S1 and S2 servo bursts. These states of detected by control circuitry, subsequently described, thereby to discriminate among four storage data tracks within a group of data tracks as the transducer is moved between adjacent data sectors. When three subsectors are used as illustrated in FIG. 2B, the system can discriminate among eight data tracks. Likewise, when four subsectors are used as illustrated in FIG. 2C, the system can discriminate among sixteen data tracks, and so on.

Figures 2F, 7:
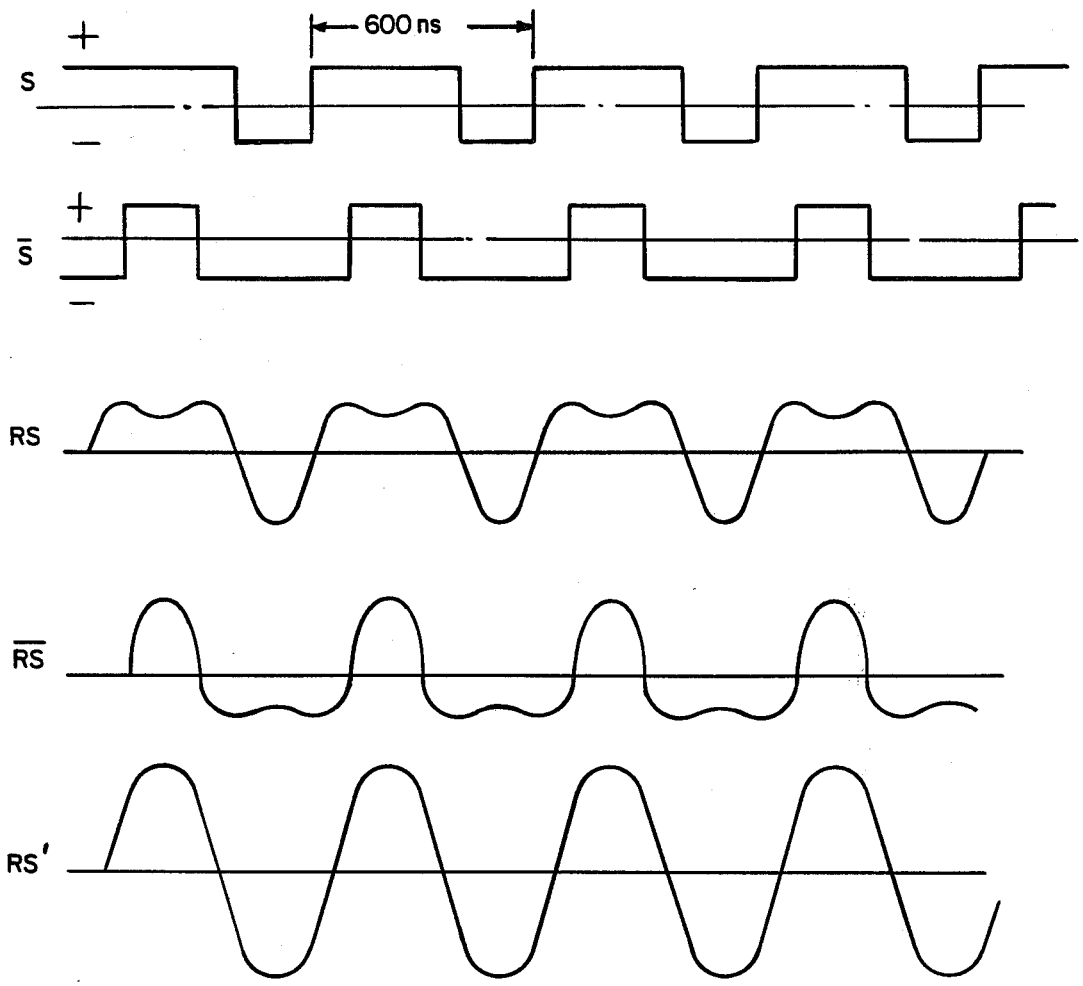
FIG. 2F shows a pair of complementary signals, their recorded response characteristic, and ther composite waveforms which are associated with the magnetic disk.
FIG. 7 depicts the organization of a drive command word that is received by the circuitry shown in FIG. 6.

The servo signals recorded in two sets of blocks of FIG. 2D are depicted in FIG. 2F. As shown therein, each block contains a "burst" of several cycles of an asymmetrical pulse train of a predetermined duty cycle. In one specific embodiment, as shown in FIG. 2F, one burst comprises flux reversals that are produced by recording a reference square wave "S" having a 600 nano-second cycle period with approximately a 67% "duty-cycle". The "duty-cycle" is the proportion of the cycle time that the signal is positive. A second burst of servo information is recorded in radially adjacent block using a complementary pulse train shifted in time 180° in phase from the reference clocking signals. This square wave is designated as the complement of "S" in FIG. 2F and has an approximate 33% duty cycle. Other complementary duty cycle pairs also might also be used, such as 30%/70%, 60%/40%, 50%/50%, while still achieving the same or similar result, but the use of 67%/33% complementary duty cycle pair in cooperation with the electrical characteristics of the data transfer system produces a nearly sinusoidal output when the transducer is positioned at the boundary between radially adjacent servo tracks.

As known, various bandwidth limitations and other factors distort a square wave when it is recorded on a disk and further distort the recovered signal. In FIG. 2F the "RS" and the complement "RS" waveforms correspond to the signals that are generated by differentiating the signal from a read/write head when it passes over a recording of the S and S-complement pulse trains, respectively.

Figure 3A:
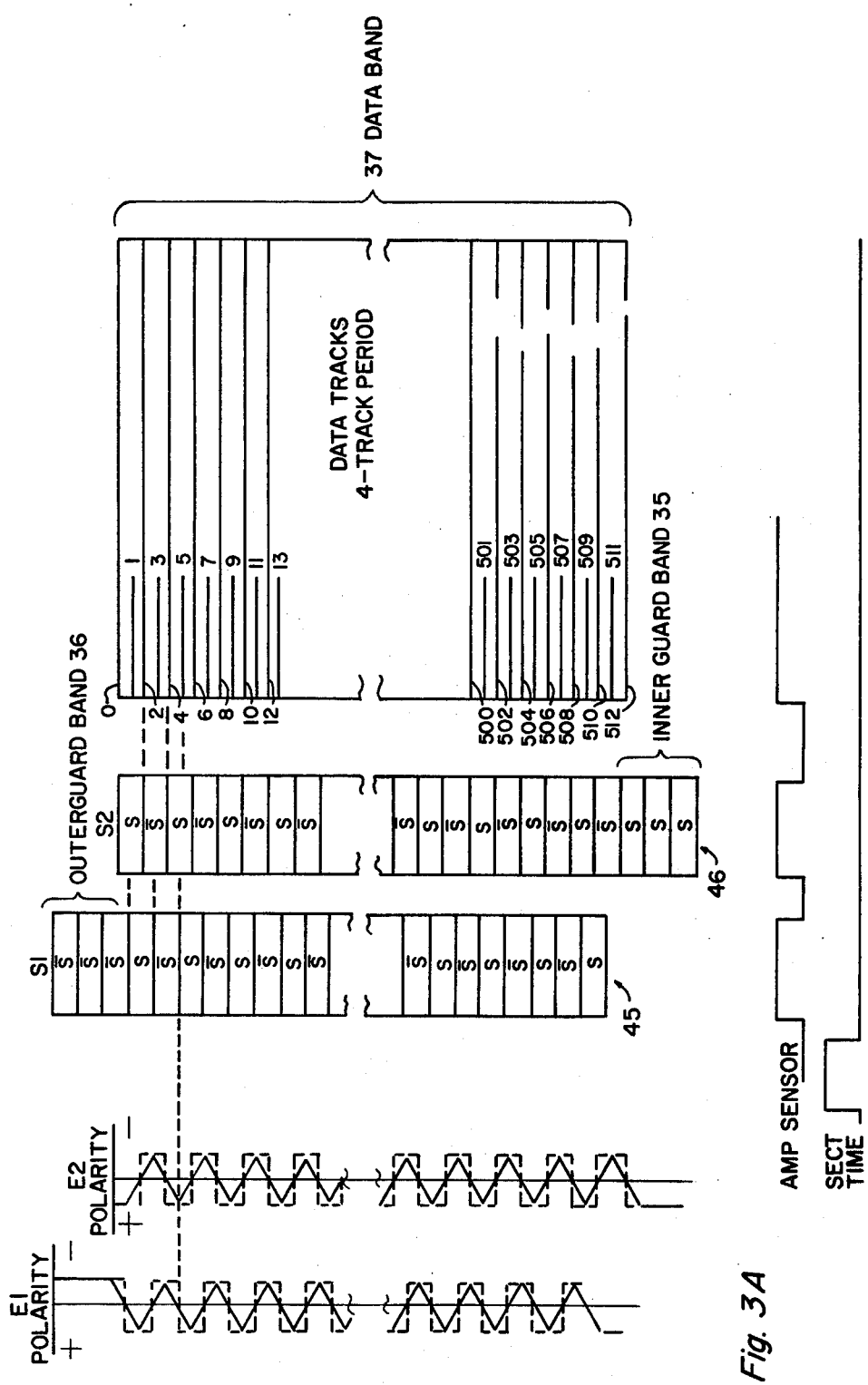
FIGS. 3A, 3B, and 3C show the spatial relationship of servo tracks and data tracks together with an indication of the polarity of signals generated by the servo information.
Figure 3B:
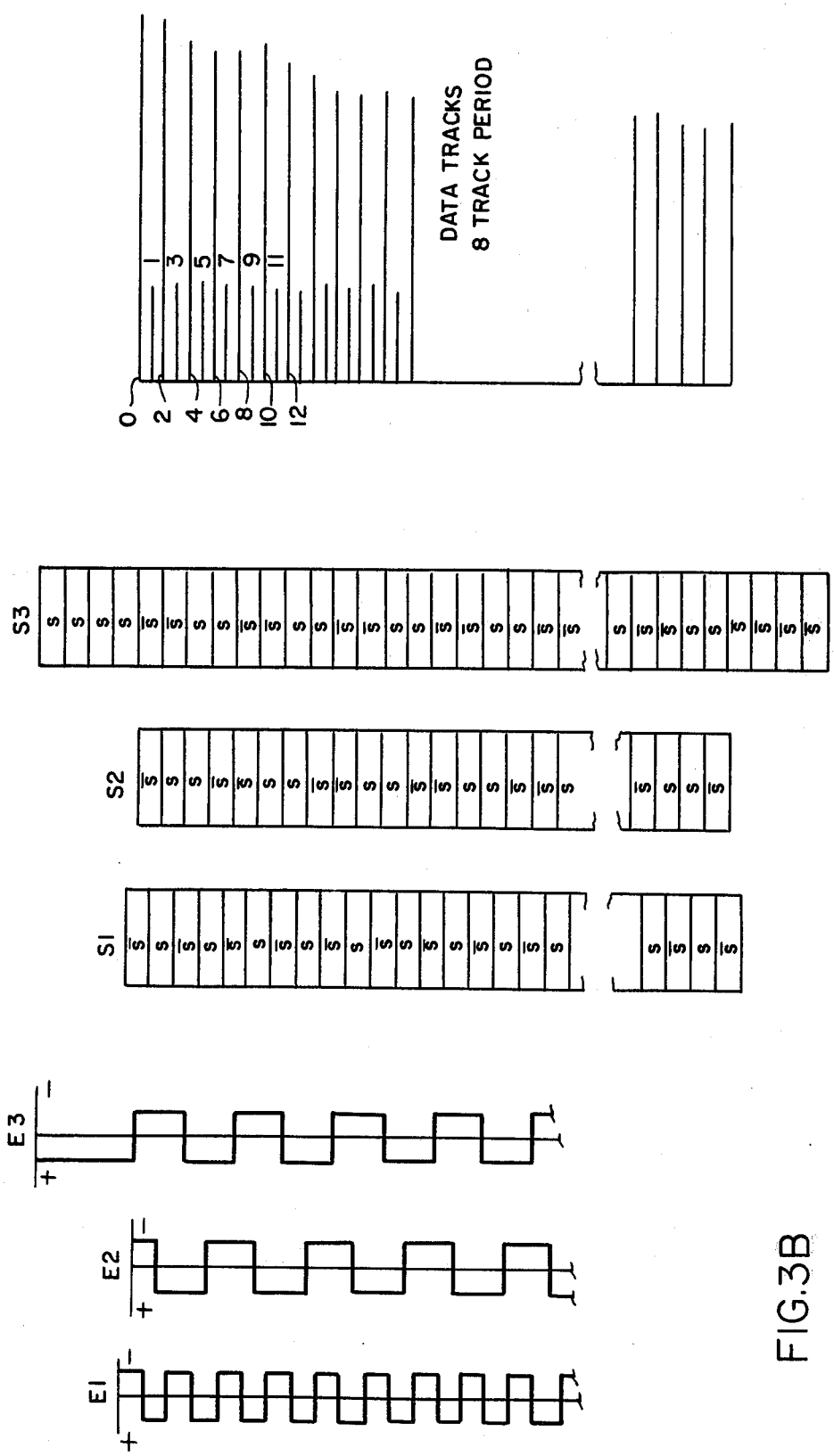
Figure 3C:
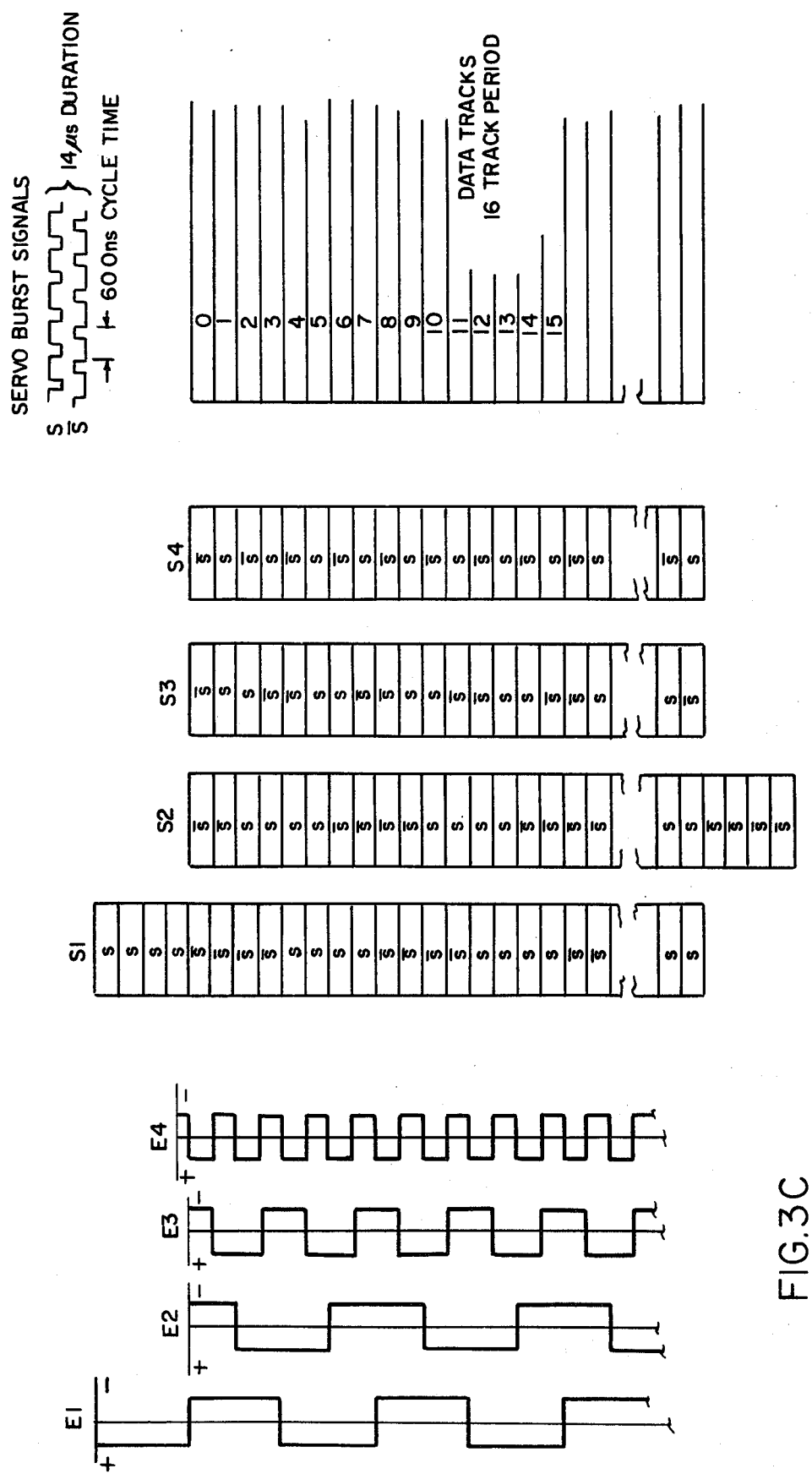

FIGS. 3A through 3C illustrate spatial arrangements of servo information blocks and data tracks on a magnetic disk for two-block, three-block, and four-block arrangements, respectively. Logic circuitry to follow data track centerlines and for counting track crossing differ among disk system for each of these arrangements. We describe herein in detail the logic circuitry for the two-block arrangement and that non-redundant portion of the logic circuitry for the three-block and four-block arrangements that would allow those skilled in the art to fully implement my inventions.

Referring specifically to FIG. 3A, the organization of the tracks in the servo sector 44 of FIG. 2A that lie between successive radial boundaries 34b-1 and 34b-2 in FIG. 2D is shown. In the servo subsector 45, the servo tracks are alternately recorded with S and S-complement signals. Servo subsector 46 is also alternately recorded with S and S-complement signals, but the servo tracks of subsector 46 are radially offset by one-half track of the servo tracks of subsector 45. The lowermost, or innermost, servo blocks of S2 constitute an inner guard band 35, while uppermost, or outermost, servo blocks of S1 constitute on outer guard band 36. The tracks intermediate the guard bands 35 and 36 are data tracks and constitute a data band 37. In the two-block arrangement, there are 256 data tracks associated with each set of the S1 and S2 servo blocks thereby to establish a total of 512 data tracks.

Still referring to FIG. 3A, the boundaries of the adjacent S and S-complement blocks in the subsector 45 define one set of data track centerlines 1, 3, 5, 7 . . . etc. The boundaries of the adjacent S and S-complement blocks of subsector 46 define a second set of data track centerlines 0, 2, 4, 6 . . . etc. All servo blocks in the outer guard band of set 45 contain the S-complement servo signals, and all servo blocks in the inner guard band of set 46 contain the S servo signals.

The read/write head of the transducer spans one servo information track in the radial direction. If the head overlies either the S or S-complement servo information block, the induced voltage is characterized by the respective RS waveform or the RS-complement waveform in FIG. 2F. If, on the other hand, the head overlies equal portions of two adjacent servo information blocks, the differentiated voltage is depicted by the RS' curve in FIG. 2F because the head sums the voltages induced by the adjacent halves of the adjacent blocks. That is, since the head spans one-half of each of adjacent blocks, the differentiated summed signal approximates a sine wave with a 50% duty cycle. By inspection of FIG. 2F, it is apparent that the average integrated value of the differentiated voltage varies from a signal of one polarity when it overlies a block recorded in response to the S signal to an opposite polarity when it overlies a block recorded in response to the S-complement signal. Integration produces a zero signal, or null signal, when the head lies between adjacent complementary servo signals. Moreover, the duty cycle varies approximately linearly as head moves radially across adjacent blocks, thus establishing a linear servo signal for controlling the positioner.

In the track following mode of operation of the positioning system, the signal generated at the two sets of boundaries of the adjacent blocks in the servo blocks 45 and 46 is used to locate respective sets of odd and even track centerlines. Thus, any deviation from a 50% duty cycle of the signal induced in the heads while the set 45 passes is a measure of head misalignment with respect to odd numbered data tracks. This signal is used by the DC servo control circuit 31 to maintain the heads in a proper position with respect to the tracks during a following operation. Likewise, an deviation from a 50% duty cycle with respect to set 46 also is a measure of head misalignment for even numbered data tracks.

Logic circuitry selects a set 45 or 46 depending upon which set selected data track is aligned.

Figure 3D:
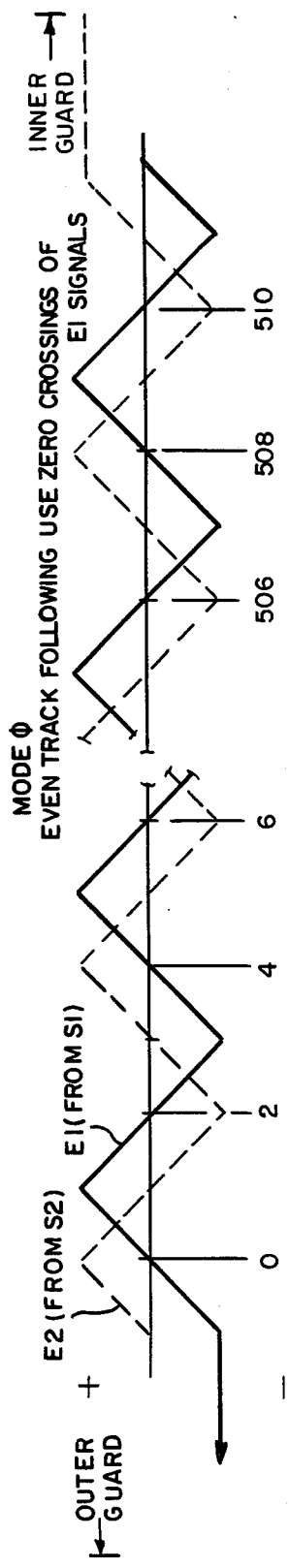
FIG. 3D illustrates the polarity signals generated by the servo signals of FIG. 3A.
Figure 3D:
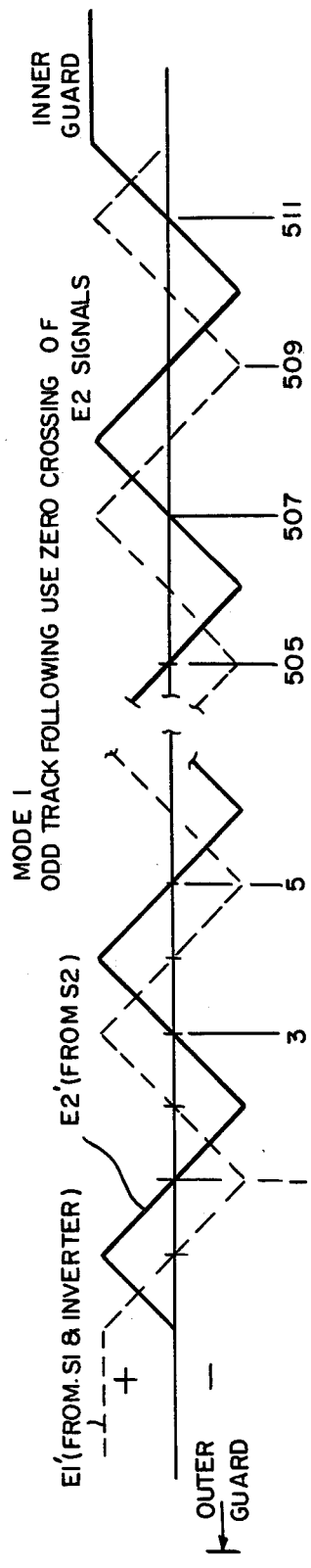
Figure 3D:
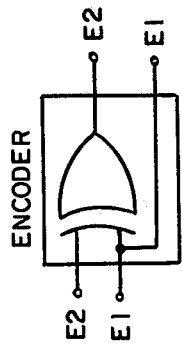
Figure 3E:
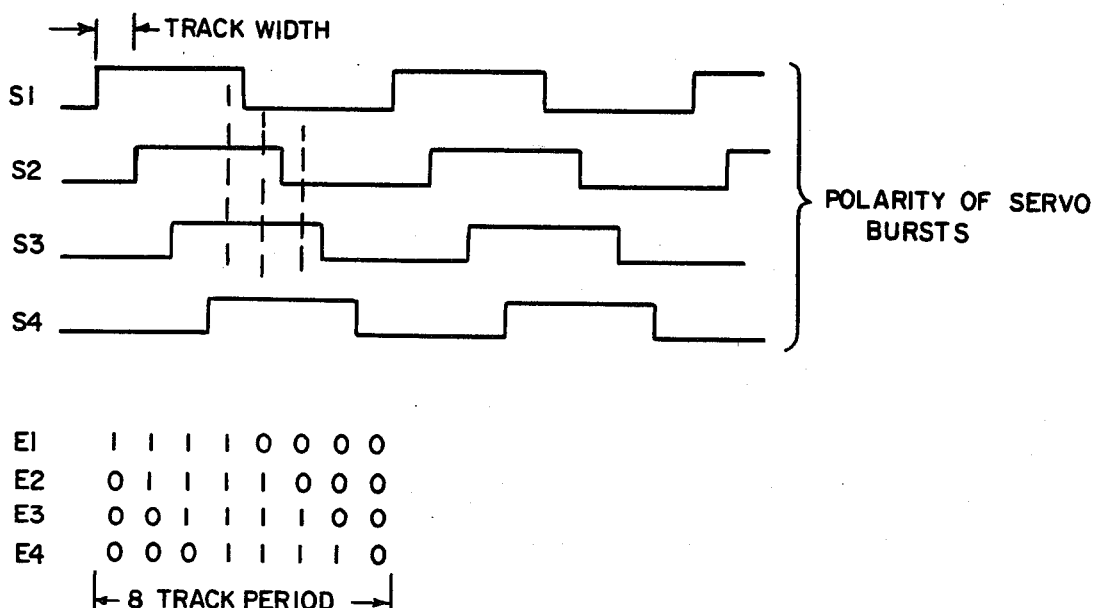
FIGS. 3E and 3F show square wave characterizations together with their associated track encoding schemes of positioning system having four and three sets of spaced servo information blocks, respectively.

For track seeking and track counting operations, logic circuitry is used to detect changes in polarity of S and S-complement signals as measured by the transducer as it moves accross servo blocks between adjacent data sectors. Implementation of the logic to perform track seeking and counting function can be derived from a plot as a function of radial head position is shown in FIG. 3D (also shown vertically in FIG. 3A). More specifically, an E1 waveform conceptually represents the integration of the differentiated voltages produced by the recording in the servo information blocks of the set 45 while an E2 waveform represents the integration of the differentiated voltages produced by the servo information blocks of set 46. The ghost lines of the E1 and E2 waveforms of FIG. 3A show conceptual positive and negative polarities of the waveforms and are assigned "1" and "0", respectively, so that a positioning state is defined by two binary elements, E1 and E2. A change in the position state will occur when the read/write head crosses a boundary of either the S1 subsector or the S2 subsector. Logic circuitry, which is subsequently described, detects the successes instantaneous states of E1 and E2 between the initial and final position of the read/write heads between successive sample periods to determine the number of tracks moved.

Since there are at most four different states that can be represented by E1 and E2, the identification of tracks in the data band is repetitive every fourth track. Consequently, for moves more than four tracks between sample periods, additional information is needed. One method of resolving that ambiguity is to provide a velocity detector that measures the speed of the positioner. The velocity detector produces a number of additional signal levels that are used by the logic circuitry to calculate the number of groups of four tracks across which the positioner has moved. It is only necessary to determine whether the positioner has moved 4+ tracks, 8+ tracks, 12+ tracks, etc. The remaining ambiguity is resolved by the state of E1 and E2. Thus, a less accurate and less costly velocity detector may be employed.

The conceptual E1 waveform, corresponding to the servo signals of subsector 45, makes a positive zero crossing at respective E1 track centerlines as the head moves from the outer guard band toward the inner guard band across E1 data track numbered 0, and a negative zero crossing at its second associated data track (i.e. data track numbered 2). From this graph it is thus evident that there is a positive zero crossing of this waveform at every second E1 track crossing and a negative zero crossing at every other E1 track crossing; that is, so long as the head travels radially inward toward the inner guard band. When the head moves in the reverse direction, the positive and negative zero crossings correspond to odd and even tracks, respectively.

The conceptual E2 waveform, corresponding to the servo signals of subsector 46, makes a negative zero crossing at respective E2 track centerlines as the head moves across E2 data track numbered 1 from the outer guard band toward the inner guard band, and a positive zero crossing at E2 data track numbered 3. From this graph it is thus evident that there is a negative zero crossing of this waveform at every second E2 track and a positive zero crossing at every other E2 track; that is, so long as the head travels radially inward toward the inner guard band. Track counting logic circuit logically determines track position from the polarities of the E1 and E2 signals as the transducer moves accross these servo blocks, the velocity of the positioner, and the direction of the positioner.

These same principles are applicable for the three-block and the four-block arrangements. For example, in FIG. 3B, servo subsector S1 contains alternate S and S-complement blocks of servo signals, subsector S2 contains alternating pairs of S and S-complement blocks, and subsector S3 also contains alternating pairs of S and S-complement blocks. The servo subsectors are radially aligned so that the respective E1, E2, and E3 waveforms define unique and distinguishable data tracks in the data band in accordance with the combination of the three states also shown in FIG. 3F. Velocity measurements may be even more coarse when three subsectors are used as there now exist an eight-track period for the work data tracks. When the maximum radial speed of the transducer is such that not more than eight work data tracks can be crossed between successive servo sectors, the velocity detector may be eliminated.

Still referring to FIG. 3B, two of the servo subsectors S2 and S3 are in radial alignment and one of the servo subsectors S1 is shifted one-half track with respect to the other two subsectors. Thus, only two unique sets of data tracks are defined. In each of the servo subsectors contained alternating S and S-complement blocks, as in the two-subsector version, the three-subsector arrangement could define three sets of data track centerlines by shifting each subsector one-third track with respect to the others. Likewise, a four-subsector arrangement could define four sets of data tracks, and so on.

Figure 3F:
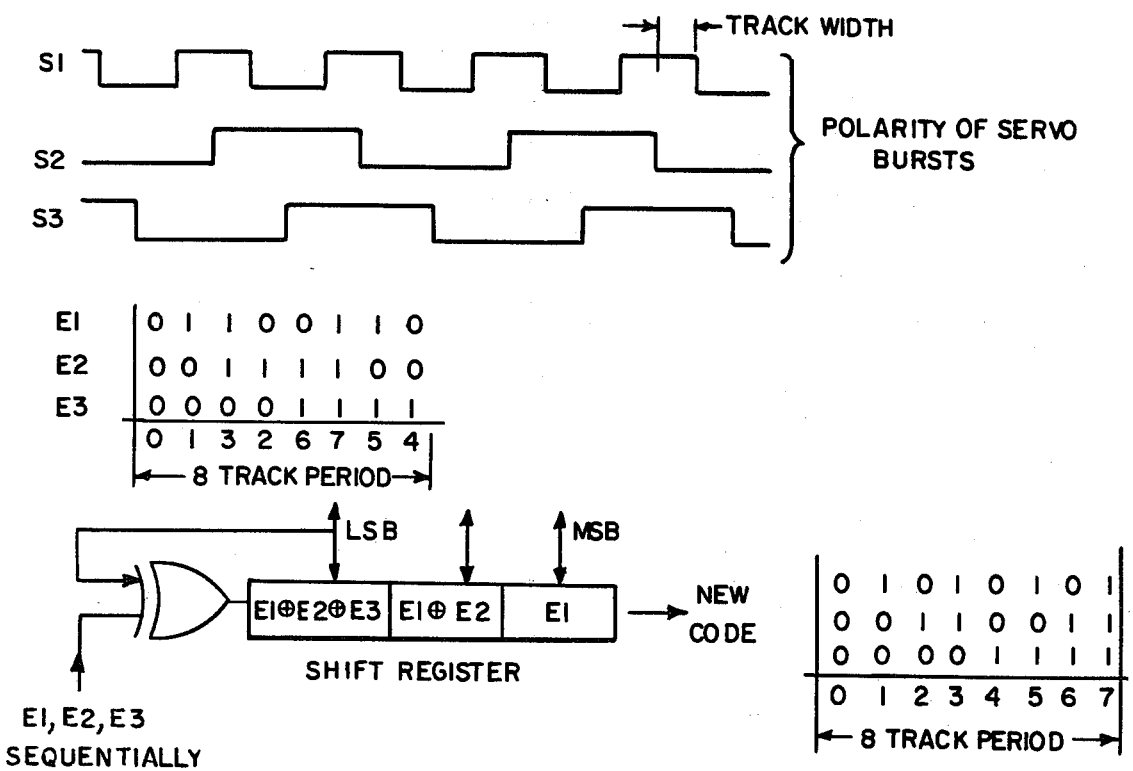
Figure 3G:
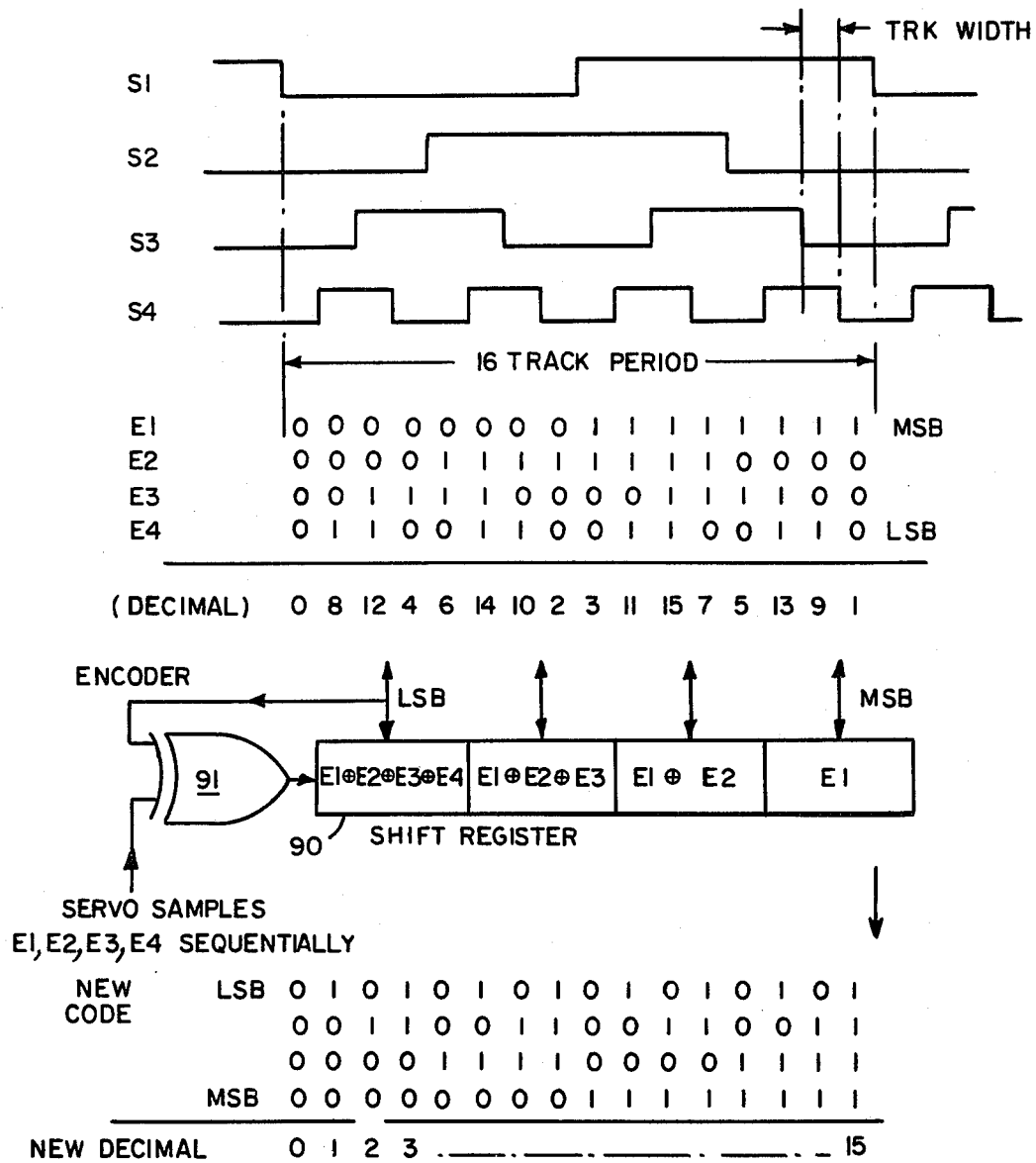
FIG. 3G shows a square wave characterization and an associated track encoding scheme of a positioning system having four sets of spaced servo information blocks.

FIGS. 3F and 3G also show examples of various conceptual waveforms and logic encoders which may be used to encode the three or four waveform systems. The track location is determined by subtracting an initial servo sample set from a final servo sample set. Particularly, in FIG. 3G, a shift register 90 serially receives bit representations that indicate polarity of the respective waveforms through an "exclusive or" gate 91. The other input to exclusive OR gate 91 is the previously encoded signal which is zero for the first signal. Upon receipt of each bit, the register shifts the contents thereof one place to the right. When all servo bits have been sampled, the track identification word is complete, whereupon, the number of tracks transversed by the positioner is computed by subtraction as previously stated. Prior to receiving each servo sample, the entire contents of the register is cleared, Truth tables for the track identification logic also are shown in FIGS. 3F and 3G.

With this understanding of the underlying theory of operation of this invention and the data disk to be utilized, it is possible to describe a typical disk drive unit as shown in FIG. 1 by referring to the different circuit elements in detail.

Figure 4:
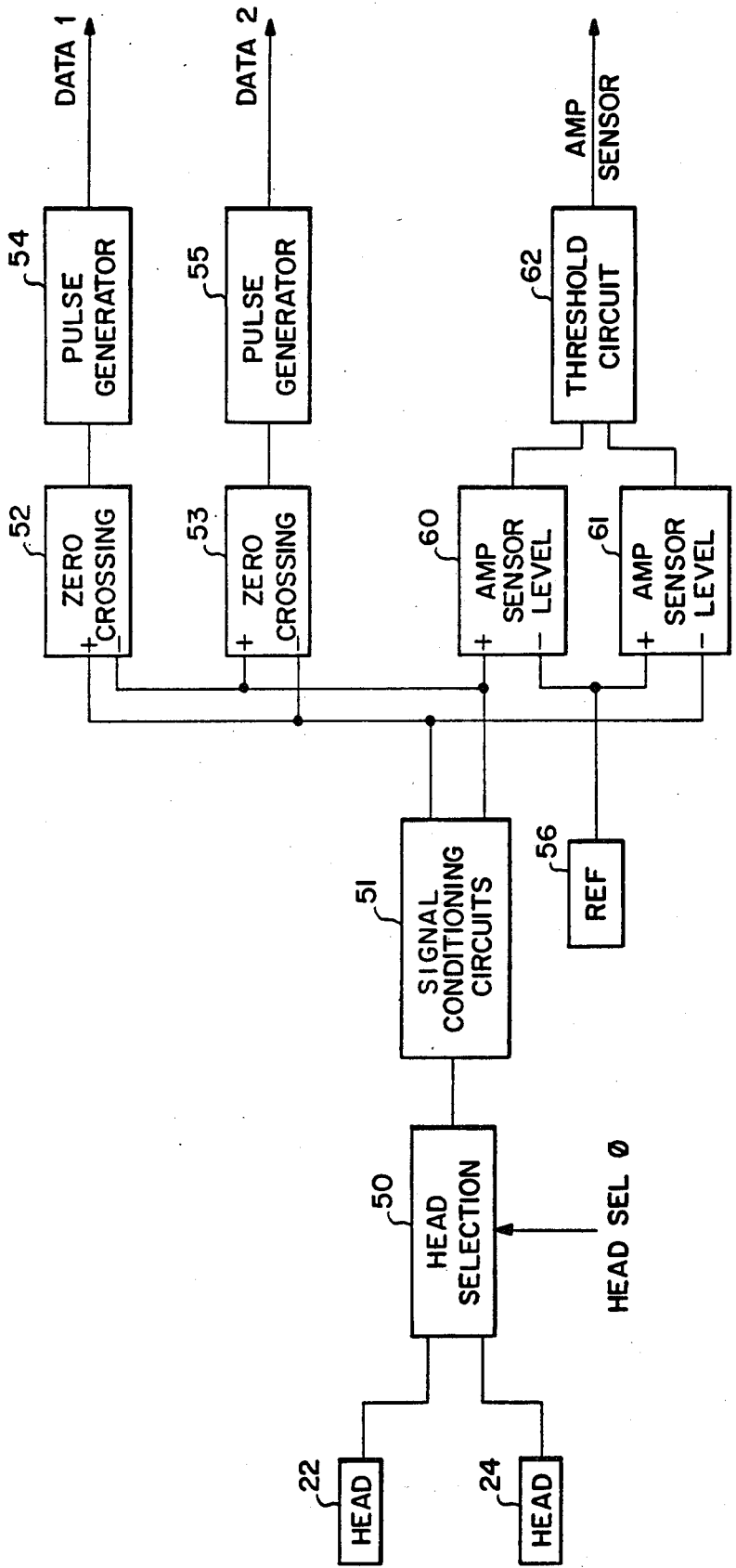
FIG. 4 is a detailed block diagram of the read/write circuits shown in FIG. 1.
Figure 6:
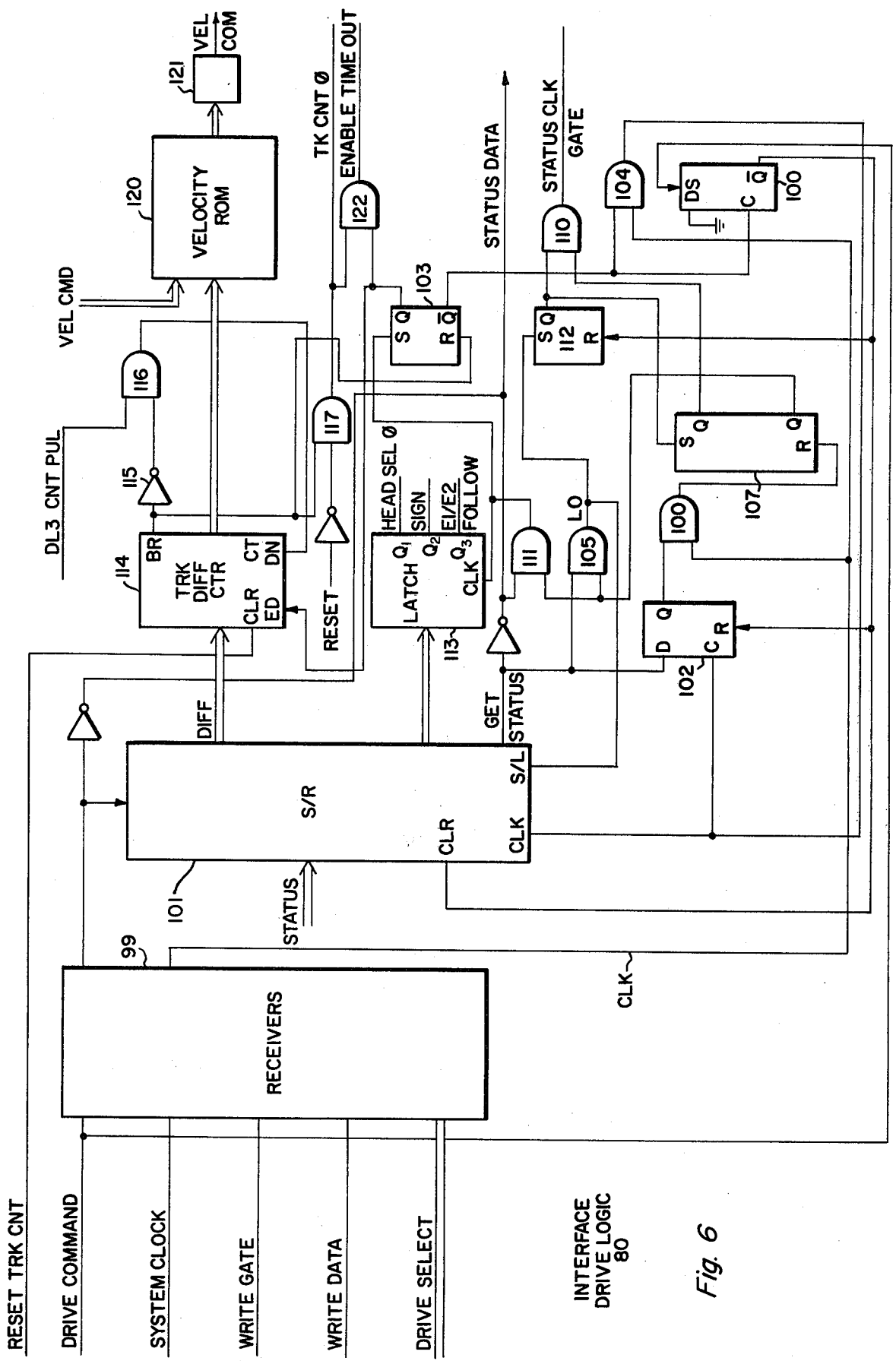
FIG. 6 is a detailed logic diagram of the interface-drive logic circuit shown in FIG. 1.

In the absence of a circuitry signal on the WRITE GATE line in FIG. 6, the read/write circuits 26 in FIG. 4 operate in a reading mode. This is true as the servo spaces 44 pass the heads. Signals from the selected ones of the heads 22 and 24 pass through a head selection circuit 50 that responds to a HEAD SEL 0 signal from the control logic 27 in FIG. 1. Signals from the selected head pass through signal conditioning circuits 51 that amplify, filter and differentiate the signals. These signals then are applied to zero crossing detectors 52 and 53 which sense the zero crossings of the induced voltage and trigger pulse generators 54 and 55 that produce DATA 1 and DATA 2 pulses at corresponding ones of the negative and positive zero crossings. Data 1 and Data 2 pulses activate flip-flops to produce square wave signals having a duty cycle which varies according to the proximity of the head to a particular S/S boundary. A predetermined number of Data 1 and Data 2 pulses are received by an integrator for track centering purposes.

The signals from the circuits 51 also are compared with a signal from a reference 56 in amplitude sensor level detectors 60 and 61. A threshold circuit 62 generates an AMP SENSOR signal after the leading edge of any information passes the head. The AMP SENSOR signal therefore tends to discriminate noise from actual signals and is asserted three different times during each sector as shown in FIG. 2B. More specifically, it identifies the passage of the sets 45 and 46 and the data sector 40. The DATA 1, DATA 2 and AMP SENSOR signals pass through the read/write circuits 26 into the control logic 27.

Figure 5:
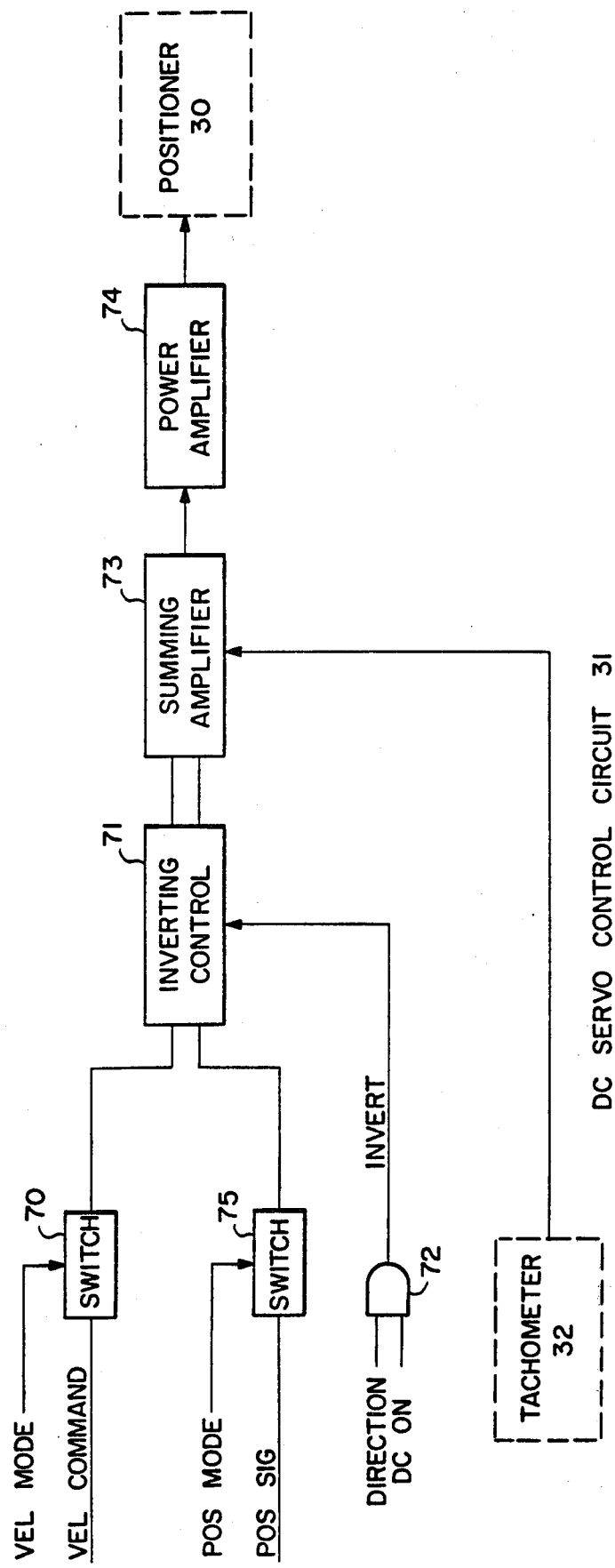
FIG. 5 is a detailed block diagram of the DC servo control circuit shown in FIG. 1.

The DC servo control circuit 31 is shown in FIG. 5. During a seeking operation, the control logic 27 of FIG. 1 generates a VEL MODE signal which causes a switch 70 to couple a multiple-level VEL COMMAND signal to an inverting control circuit 71. The inverting control 71 responds to a DIRECTION signal that is coupled to the inverting control 71 through an AND gate 72 whenever a DC ON signal is asserted, indicating that the DC power level is at an acceptable level. The signals from the inverting control 71 then are combined with signals from the tachometer 32 to produce a driving signal for a power amplifier 74 that, which in turn, actuates the positioner 30 to relocate the selected head to the desired track position, whereupon the VEL COMMAND signal is reduced nearly to zero.

Once the positioner 30 moves the heads to the appropriate track and reduces in velocity, the control logic 27 terminates the VEL MODE signal and asserts a complementary POS MODE signal. This signal enables a switch 75 to couple a POS SIG signal to the inverting control 71 and thereafter the positioner 30 moves the heads 22 and 24 to a final position and maintains the POS SIG signal at a null value that is located at the boundary of a positive and negative servo burst in a selected one of the subsectors.

Referring again to FIG. 1, the control logic 27 comprises a number of circuits. For purposes of understanding this invention, this circuitry can be classified as an interface-drive logic circuit 80, a state control circuit 81, an integrator logic circuit 82, a drive speed logic circuit 83 and a count logic circuit 84.

If E1 and E2 are encoded by the encoder of FIG. 3D, to produce the representation of table B, track difference is readily computed by subtraction. A direction bit and velocity signal also are used in connection with calculating track difference.

The control of transfer of information to and from a disk is produced in response to a number of signals that are received from the controller by receivers 99 in the interface drive logic circuit 80 shown in FIG. 6. In this drawing only a single line is shown for each signal. Two lines generally are used to enable a differential transmission of signals. These signals include a SYSTEM CLOCK pulse train which the receivers 99 convert to CLK pulses. The previously mentioned WRITE GATE signal controls whether a reading (transfer from the media) or writing (transfer to the media) operation occurs over the data sectors. WRITE DATA line transfers data to the medium during a writing operation. DRIVE SELECT signals identify which one of plural drive units connected to a single controller is to be used in a transfer. A controller initiates an exchange of data with the disk drive unit by transmitting a DRIVE COMMAND word shown in FIG. 7, over a corresponding line serially by bit. The first bit is always a ONE and is a MARKER bit. The other bits in a DRIVE COMMAND are interpreted as follows:

(1) A GET STATUS bit is asserted to transfer status information back to the controller; when the GET STATUS bit is not asserted, the incoming word is interpreted as a request to perform some other operation in response to other bits in the DRIVE COMMAND word.

(2) A SIGN bit is asserted to indicate that the heads are to move toward the inner guard band and is not asserted to indicate the heads are to move toward the outer guard band; it is interpreted when the GET STATUS bit is not asserted.

(3) A RESET ERROR bit is asserted to clear error conditions.

(4) A HEAD 0 bit is asserted to select the head 22 and is not asserted to select the head 24 for an ensuing operation; it is interpreted when the GET STATUS bit is not asserted.

(5) TRACK DIFFERENCE bits identify the number of tracks to be moved during a seeking operation; this difference is used in conjunction with the SIGN bit to control the signals to the positioner 30 in FIG. 1.

(6) E1/E2 FOLLOW bit identifies which of two servo subsector signal boundaries are to be followed in the track following mode. This bit is the least significant bit of the track address.

Referring again to FIG. 6, when the MARKER bit appears on the DRIVE COMMAND line, it presets a clear latch 100 to remove an overriding clearing signal from various registers and circuits including a shift register 101 and a marker latch 102.

As described later, a track difference load latch 103 is cleared prior to the receipt of a DRIVE COMMAND. It therefore enables CLK pulses to pass through an AND gate 104 to shift the DRIVE COMMAND into and through the shift register 101. Serial shifting is enabled by a disabled AND gate 105.

These bits in the DRIVE COMMAND word shift through the shift register 101 until the MARKER bit is clocked into the marker flip-flop 102. The next CLK pulse then energizes an AND gate 106 to clear a marker latch 107 thereby simultaneously disabling an AND gate 110 and enabling the AND gate 105 and an AND gate 111. If the GET STATUS bit is asserted, the AND gate 105 presets a status latch 112 that was cleared by the latch 100. The status latch enables the AND gate 110 and presets the marker latch 107 thereby to enable circuitry, that is not shown, to generate status clock pulses to transfer status information back to the controller 13.

When the GET STATUS bit is not asserted, the status latch 112 remains cleared and disables the status clock AND gate 110. However, the AND gate 111 is energized and clocks a three-stage latch 113 thereby to store the SIGN, HEAD SEL 0, and E1/E2 FOLLOW bits. Simultaneously, the AND gate 111 sets the track difference counter load latch 103 that performs three functions. First, it loads the TRACK DIFFERENCE bits in parallel from the shift register 101 into a track difference counter 114; it also disables the AND gate 104 thereby terminating the CLK pulses that are coupled to the shift register 101 and the marker latch 102; thirdly, it conditions the latch 100 to be cleared when the latch 103 is reset. The least significant bit of the track difference word is not loaded into the track difference counter 114. Therefore, for each increment or decrement of the difference counter 114, two data tracks are crossed. The selection of which pair of tracks to be followed is specifically determined by the E1/E2 FOLLOW bit which enables the appropriate detector 162 or 163 of FIG. 10.

Normally a BORROW (BR) output from the track difference counter 114 is not asserted. Thus, whenever the heads are not properly positioned, an inverter 115 enables an AND gate 116 to couple CNT PUL pulses to the count-down input of the counter 114 thereby decrementing the counter on the leading edge of each CNT PUL pulse. When the difference in the counter 114 reduces to zero, the trailing edge of CNT PUL pulse causes the counter 114 to assert the BR signal. The BR signal disables the AND gate 116 and prevents any further change in the counter 114. However, the BR signal also energizes an AND gate 117 that generates a TK CNT 0 signal that indicates the selected head is at the desired track. The TK CNT 0 signal also energizes an AND gate 122 to transmit an ENABLE TIMEOUT signal that initiates a timing interval during which the heads must stay within a final position for reading or writing information.

The output signals from the track difference counter 114 constitute address signals to a read-only velocity memory 120. VEL CMD signals from the state control circuit 81 constitute other address signals. The memory 120 stores, among other things, different numbers that correspond to discrete velocities. These signals are coupled to a summing circuit 121 where they are weighed and summed to generate the multiple level DC VEL COM signal that is transferred to the switch 70 in FIG. 5. The magnitude of the VEL COM signal decreases as the number from the track difference counter is reduced to zero. In one embodiment, the VEL COM signal establishes a velocity of 33 inches per second (ips) where the track difference is greater than 40 and decreases the velocity of about 3 ips at a track difference of less than ten.

Figure 8:
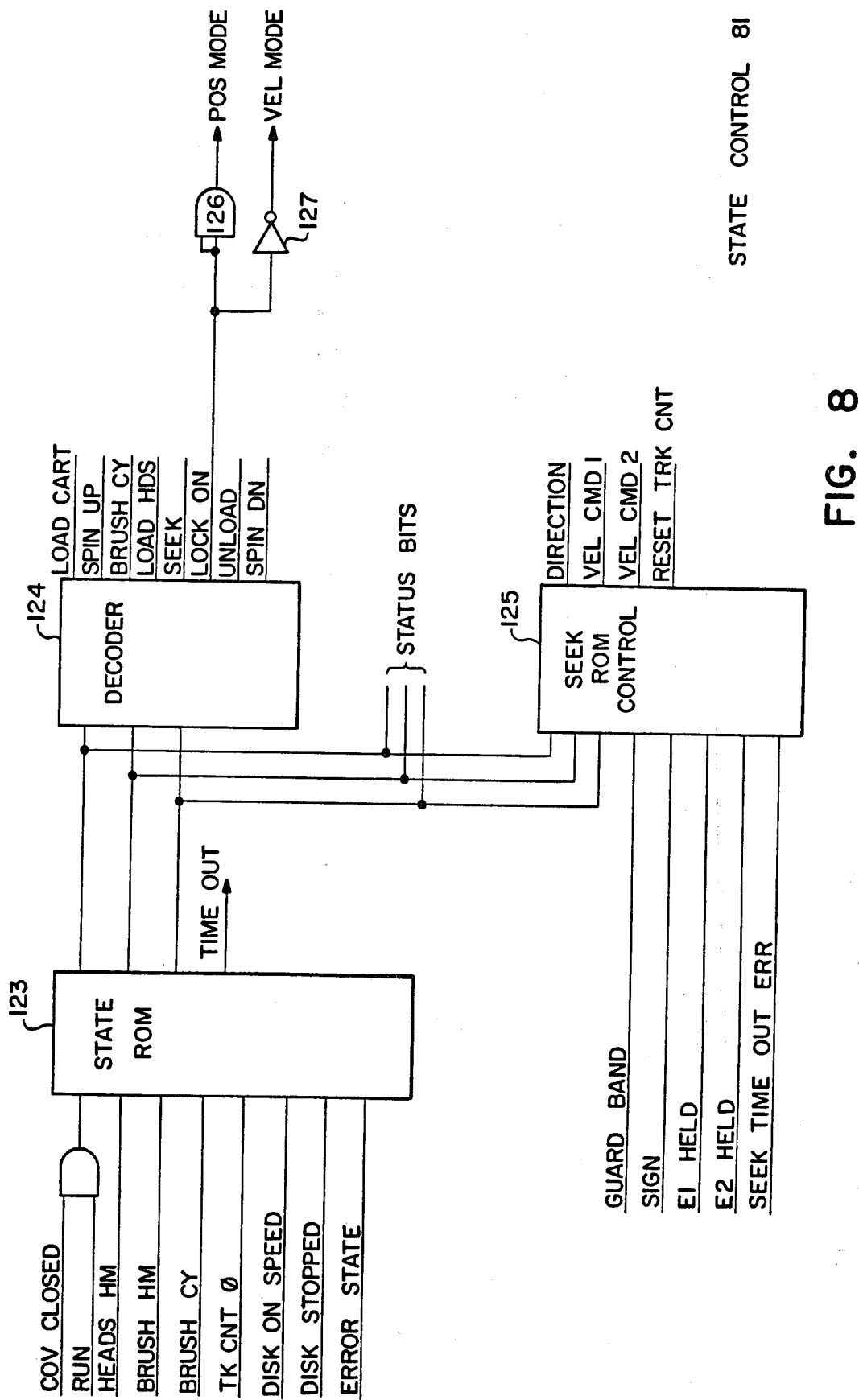
FIG. 8 is a detailed logic diagram of the state control circuit shown in FIG. 1.

Now referring to FIG. 8, the TK CNT 0 signal from the AND gate 117 in FIG. 6 is applied to a state read-only memory 123. The memory 123 also receives a number of other signals indicating the status of the drive. These include a COV CLOSED signal that indicates that an access door is closed. A RUN signal is generated by a control panel switch on the disk. A HEADS HM signal indicates that the heads are at a home position. BRUSH HM and BRUSH CY signals indicate, respectively, whether the brushes have been retracted to a home postion or whether the brush motor is being actuated during a brush cycle. A DISK STOPPED signal indicates that the disk has stopped and an ERROR STATE signal indicates that an error condition exists. All these signals constitute addresses to the state read-only memory 123.

In this particular embodiment, the possible generalized conditions which these input signals define can be specified by four binary bits. A decoder 124 and a seek read-only memory control 125 receive corresponding output signals from the memory 123 and, in conjunction with other signals, decode these signals.

The decoder 124 defines, in this specific embodiment, eight of those conditions. These include a LOAD CART state during which the drive needs a disk cartridge that carries the disk itself. SPIN UP and SPIN DN signals indicate, respectively, that the disk is accelerating to or decelerating from its operating speed. The BRUSH CY signal indicates that a BRUSH CYCLE is being performed. A LOAD HDS signal indicates that the heads are being moved to a home position. A SEEK signal indicates that a seeking operation is underway whereas a LOCK ON signal indicates that the heads have moved to a designated track (i.e., the track difference has been reduced to zero). An UNLOAD signal indicates that the heads are being retracted.

The state read-only memory 123 also produces a TIME OUT signal under certain operating conditions. The signals that are applied to the decoder 124 are also applied to the seek read-only memory control 125 for purposes that are described later.

Of particular interest at this point, is the LOCK ON signal. It responds to DISK ON SPEED and TK CNT 0 signals. When the LOCK ON signal is asserted, a buffer gate 126 generates the POS MODE signal that is applied to the switch 75 in FIG. 5. Whenever the LOCK ON signal is not asserted, an inverter 127 asserts the VEL MODE signal that is applied to the switch 70 in FIG. 5.

Figure 9:
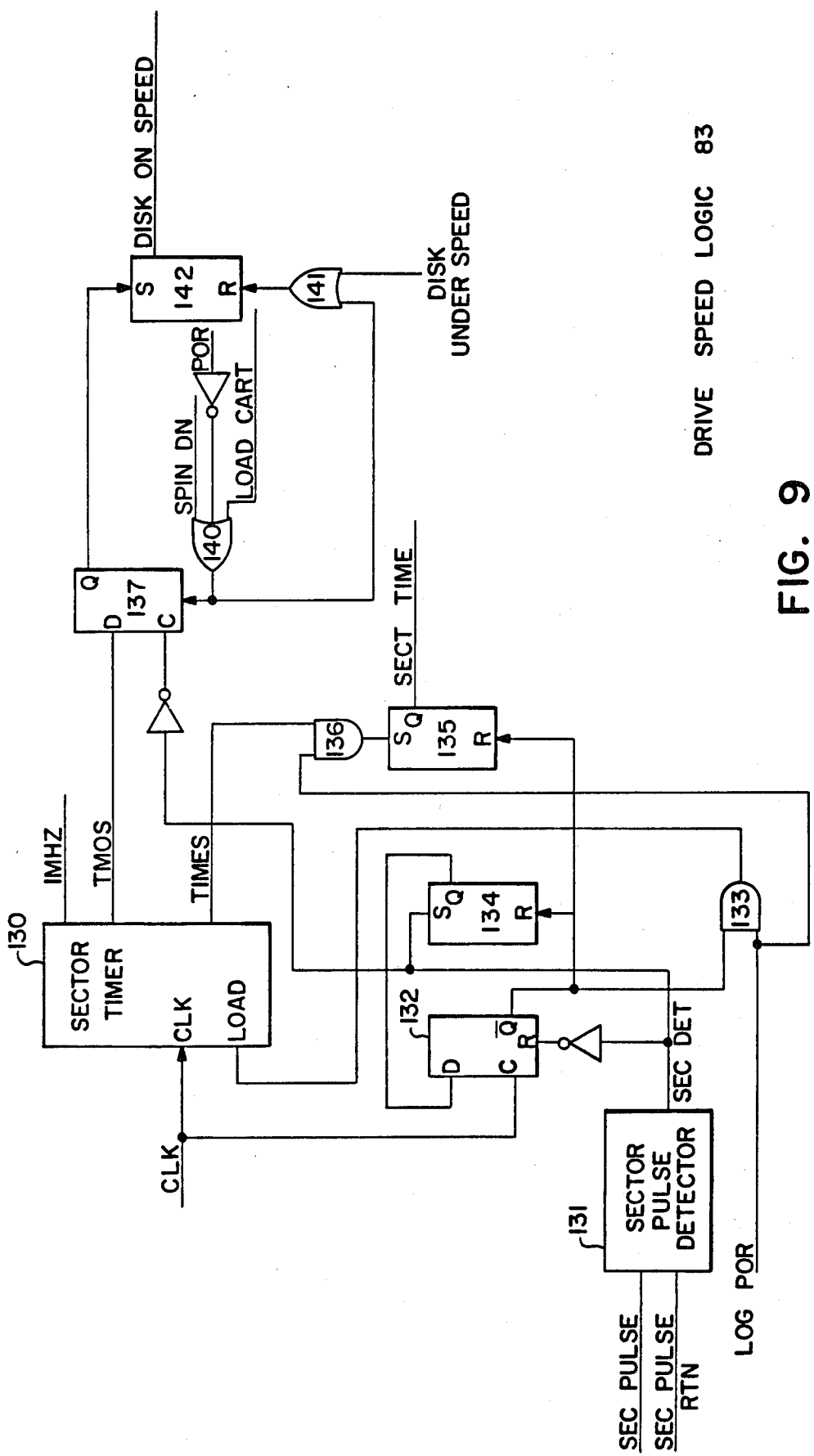
FIG. 9 is a detailed logic diagram of drive speed logic circuit in FIG. 1.

The DISK ON SPEED signal is generated by the drive speed logic circuit 83 shown in FIG. 9. This circuitry operates in response to CLK pulses from the receivers 99 in FIG. 6 and SEC PULSE and SEC PULSE RTN signals generated by a circuitry associated with the transducer 33 shown in FIGS. 1 and 2A. This circuitry includes a sector timer 130 comprising a counter and associated decoding circuitry to identify different time intervals.

Referring now again to FIG. 2D, each notch cut in the plate 34 is centered at approximately the boundary between a prior data sector and the space containing the servo information. As one notch is centered on the radius, 34b-1 and its right and left edges are positioned so that the center of the notch is in alignment with the trailing edge of the data sector "n-1". In one embodiment the transducer 33 comprises a reluctance pickup and the associated circuitry transmits a SEC PULSE pulse when the left edge passes and a SEC PULSE RTN pulse when the right edge passes. A sector pulse detector 131 in FIG. 9 produces an SEC DET signal approximately midway between the SEC PULSE and SEC PULSE RTN pulses.

While the transducer is positioned between notches, the SEC DET signal is not asserted so that a flip-flop 132 is held in a reset condition. While the flip-flop 132 is reset, it energizes an AND gate 133 that is enabled by a power supply status (LOG POR) signal. The AND gate 133, in turn, energizes the LOAD input of the counter in the sector timer 130 thereby to disable it.

When the sector pulse detector 131 generates the SEC DET signal, it removes the overriding resetting signal from the flip-flop 132 and sets a latch 134. Setting the latch 134 conditions the flip-flop 132 to be set by the next CLK pulse. Setting the flip-flop 132 removes an overriding reset signal from a sector time latch 135. When the sector timer 130 produces a TIMES signal during the interval required for the space between adjacent data sectors to pass the transducer 33, it energizes an AND gate 136 and sets the latch 135 to generate the SECT TIME signal. When the trailing edge of the notch passes the transducer 33, the sector pulse detector 131 responds to the SEC PULSE RTN pulse by terminating the SEC DET signal. The flip-flop 132 then resets, and the SECT TIME signal from the latch 135 terminates.

Although the SECT TIME signal is generated under all operating conditions, it cannot be used until the remaining circuitry in FIG. 9 indicates that the disk is at a proper operating speed. More specifically, the trailing edge of each SEC DET signal sets a flip-flop 137 when a TMOS signal indicates that a interval has elapsed that enables the disk to reach its proper operating speed. This circuitry also operates only if the system is accelerating. If it is decelerating, the SPIN DN signal energizes an OR gate 140 to reset the flip-flop 137. If the power is off or the disk is removed, a POR signal or the LOAD CART signal, respectively, also energizes the OR gate 140.

If the none of these conditions exist, the flip-flop 137 sets, and in turn, sets a latch 142 that generates the DISK ON SPEED signal. Under this condition, which represents a normal disk operation, the TK CNT 0 then controls whether the LOCK ON signal generated by the state control circuit 81 in FIG. 8 is asserted or not.

Figure 10:
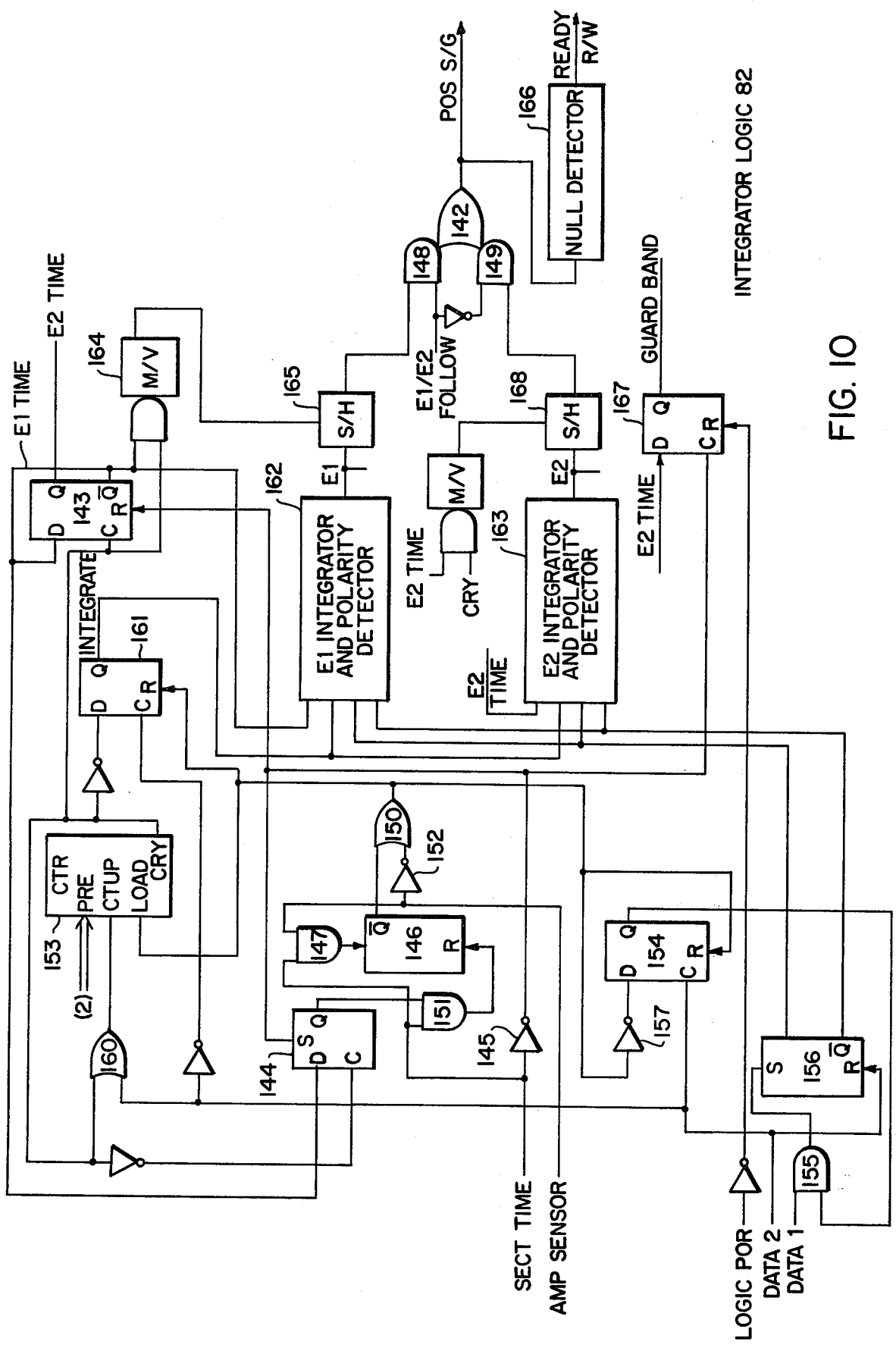
FIG. 10 is a detailed logic diagram of the integrator logic circuit shown in FIG. 1.

FIG. 10 depicts the integrator logic circuit 82 that responds to the DATA 1, DATA 2 and AMP SENSOR signals from the read-write circuits 26 shown in FIG. 4 and the SECT TIME signal from the drive speed logic 83 shown in FIG. 9. Again, we illustrate the invention for the data disk of FIG. 2D, although the invention can be applied to disks having other data arrangements, as previously indicated. While a data sensor is being read, the SECT TIME signal is not asserted, but the AMP SENSOR signal is asserted. The SECT TIME signal clears an E1/E2 time flip-flop 143 and presets a circuit enabling flip-flop 144 after passing through an inverter 145. In its reset state, the flip-flop 143 asserts an E1 TIME signal. A latch 146 is preset at this time, although an AND gate 147 that generates a presetting signal is disabled. The latch 146 therefore energizes an OR gate 150 and can not be cleared because an AND gate 151 that generates a clearing signal also is disabled. An inverter 152 inverts the AMP SENSOR before applying it to the OR gate 150.

When the OR gate 150 is energized, it applies a loading signal to a counter 153, so the counter 153 cannot respond to any clocking signals. The OR gate 150 also clears a flip-flop 154. As a result, an AND gate 155 is disabled so only the DATA 2 pulses are applied to a latch 156. The latch 156 therefore remains cleared.

When a servo space reaches the heads, the SECT TIME signal may be asserted before or after the AMP SENSOR signal shifts to a non-asserted level. If the SECT TIME signal is asserted before, both the set and reset inputs to the latch 146 are energized, so the latch 146 does not change its state. Therefore, the OR gate 150 remains energized. When the AMP SENSOR signal terminates, however, the inverter 152 energizes the OR gate 150, so it remains energized, even though the latch 146 is cleared when the AND gate 147 is deenergized. If the SECT TIME signal is asserted after the AMP SENSOR signal shifts to a non-asserted level, the inverter 152 provides second energizing input to the OR gate 150. The AND gate 147 also is deenergized. When the SECTOR TIME signal is then asserted, the AND gate 151 is energized and clears the latch 146. In either case, the OR gate 150 is now conditioned to terminate its output signal when the AMP SENSOR signal shifts to an asserted state after the first servo subsector 45 (FIG. 2D and 3A), comprising the S1 and S1 signals, passes the heads.

When the OR gate 150 is deenergized, the next DATA 2 pulse sets the flip-flop 154 because it is conditioned to be set by an inverter 157. The DATA 2 pulse also passes through an OR gate 160 to increment the counter 153 from an initial value at the beginning of each successive data cycle thereby to count a predetermined number of data cycles. Initially a carry (CRY) signal is not asserted, so the trailing edge of the next DATA 2 pulse in succession sets an integrator enable flip-flop 161 thereby to enable both E1 and E2 integrator and polarity detector circuits 162 and 163. With the flip-flop 143 cleared, only the E1 circuit 162 responds and begins to integrate the signals from the latch 156.

With the flip-flop 154 set, the DATA 1 and DATA 2 pulses now alternately set and clear the latch 156 through the AND gate 155. Thus the latch 156 produces square wave output signals that have the same duty cycle as the composite RS' waveform shown in FIG. 2F.

When the predetermined number of cycles have been counted, the counter 153 generates the CRY signal that clocks the flip-flop 143 to a set state to trigger a monostable multivibrator 164. This stores the output from the E1 detector circuits 162 in the sample and hold circuit 165. During the E2 time, sample and hold circuit 168 is similarly activated. Whenever the integration produces a null on the selected boundry, a null detector 166 generates a READY-TO-R/W pulse that indicates that the head is exactly positioned on a data track centerline. The CRY signal also conditions the flip-flop 161 to be cleared to terminate the integration.

After the servo data blocks on the set 44 pass the read/write heads, the AMP SENSOR signal again shifts to a non-asserted level thereby reenergizing the OR gate 150 to preload the counter 153 and to clear the flip-flop 154 and the integrate enables flip-flop 161. When the CRY signal terminates, it clears the flip-flop 144 because the flip-flop 143 is now set. When the second servo subsector 46 of servo blocks, comprising S2 and S2 blocks in FIG. 3A, begin to pass the heads, the AMP SENSOR signal again shifts to an asserted state and the integration cycle repeats. However, the flip-flop 143 now is set so the E2 detector circuit 163 intergrates the signals from the latch 156 thereto to produce an E2 signal.

The POS SIG provides the servo positioning signal to the servo control circuit of FIG. 5 for track following. As to whether the system will positon on the boundaries of the S1 or S2 servo burst will be logically determined by the E1/E2 FOLLOW bit, as shown in the circuit arrangement of gates 148 and 149.

The intergrator logic of FIG. 10 can also be extended to integrate more than two bursts of servo information by providing additional integrators and polarity detectors identical to detectors 162 and 163. Each additional detector would have enabling inputs from a multiple state device, similar to latch 143, to enable integration upon passage of the respective servo subsectors.

There is also shown in FIG. 10 a guard band flip-flop 167. As shown in FIG. 3A, the guard bands are characterized by only containing servo data blocks of a single polarity. If the heads are positioned in either guard band, the AMP SENSOR signal is only asserted once while the SECT TIME signal is asserted. If this occurs, the trailing edge of the SECT TIME signal sets the flip-flop 167 and generates a GUARD BAND signal as the flip-flop 143 is set.

Figure 11B:
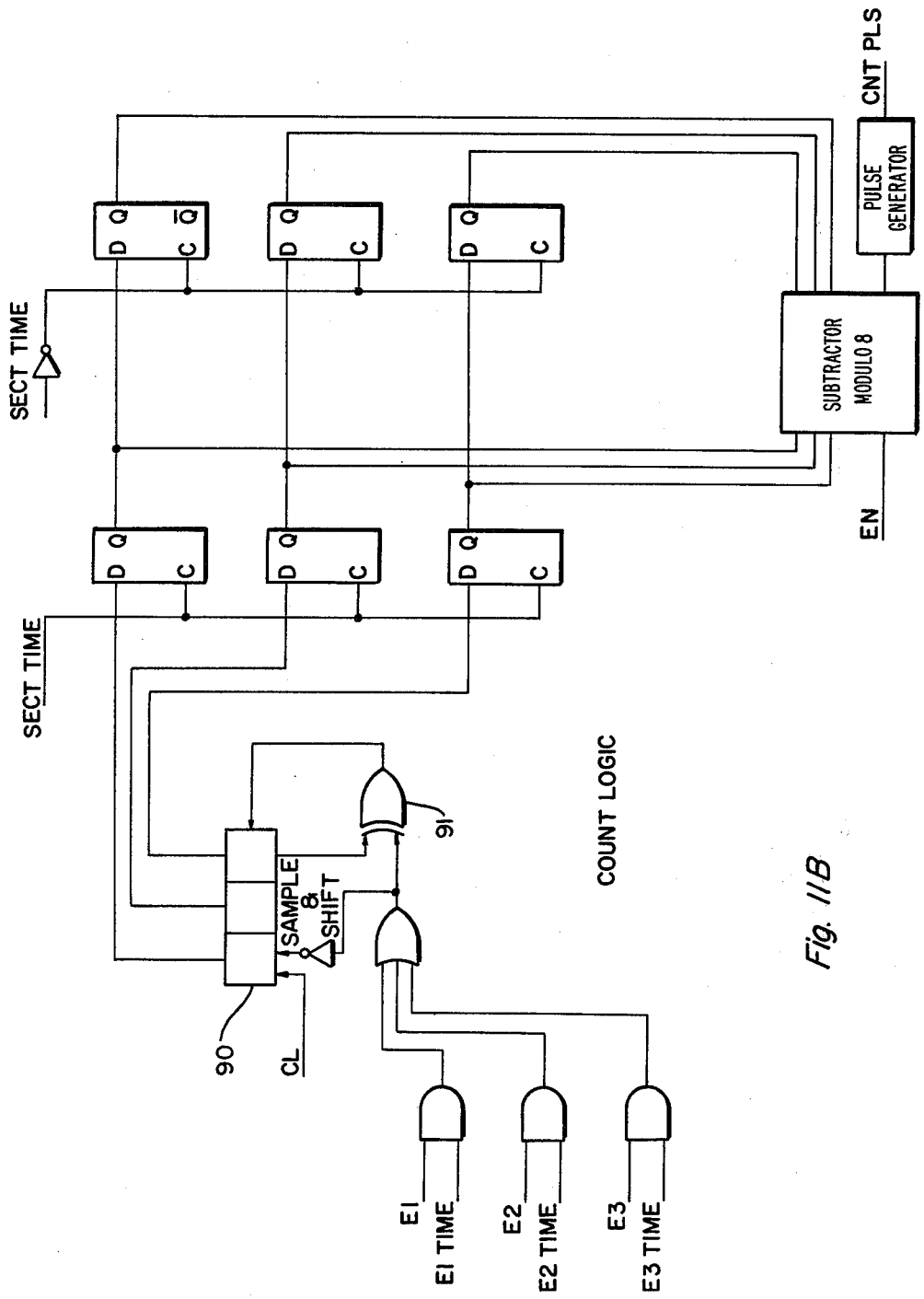
FIG. 11B is a block diagram of count logic circuitry for a positioning system of FIGS. 3B and 3F.
Figure 11C:
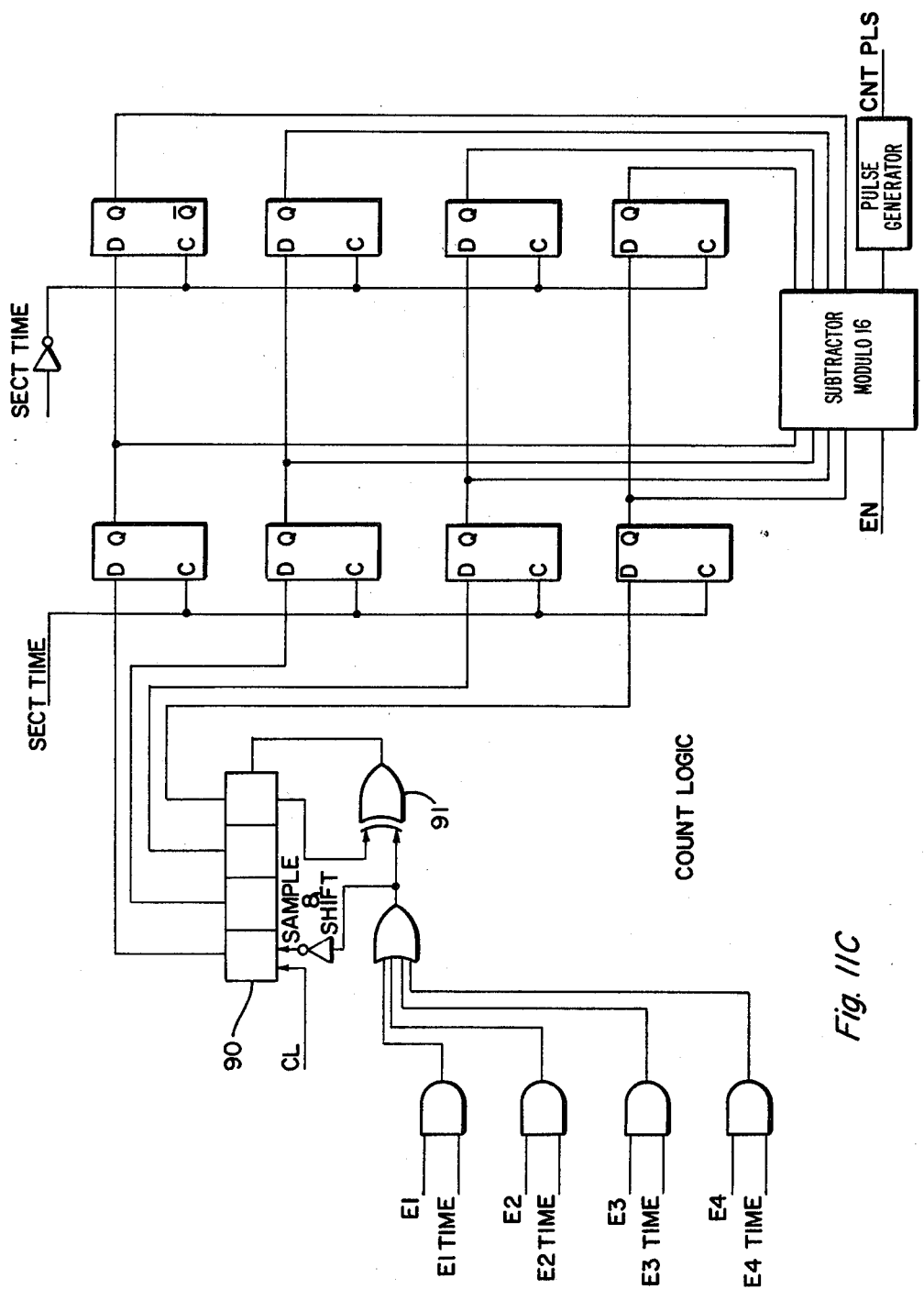
FIG. 11C is a block diagram of count logic circuitry for a positioning system of FIG. 3G.

The foregoing signals are applied to the count logic circuit 84 shown in FIG. 11A, or 11B or 11C, depending upon the number of servo subsectors employed and whether velocity detectors are utilized. The circuit of FIG. 11A is now discussed. This circuit may use the E1 and E2 signals from successive servo sectors, the SIGN signal indicating the direction of head motion, velocity signals from the tachometer, and other signals to determine the number of tracks that are traversed between successive servo areas. More specifically, the circuit in FIG. 11 receives the BORROW signal from the tracks difference counter 114 and the SIGN signal from the latch 113 in FIG. 6, the SECT TIME signal from the latch 135 in FIG. 9, the GUARD BAND signal from the flop-flop 167 in FIG. 10 and a VEL SIG signal from the tachometer circuit 32 in FIG. 1. When the SEC TIME signal is asserted at the beginning of a sector, the sector timer 130 begins to generate a 1 MHZ timing pulse that clock the E1 and E2 signal into flip-flops 170 and 171 respectively. The E2 signal is encoded by exclusive OR gate 177, as previously indicated. The outputs of flip-flops 170 and 171 are applied to a COUNT ROM 172. The VEL SIG signal from the tachometer is fed to a number of level detectors 173 and the 1 MHZ signal clocks a measure of the resultant level into flip-flops 174, 175 and 176 respectively. These signals also are applied as address signals to the count read-only memory 172.

The trailing edge of the SECT TIME signal clocks flip-flops 180 and 181 to reflect the E1 and E2 values that existed for the prior servo area. The outputs of the flip-flops 180 and 181 also constitute input address signals to the count read-only memory 172. As previously indicated, a comparison of the E1 and E2 signals for successive servo areas coupled with information concerning the direction of motion represented by the SIGN signal and the velocity represented by the signals in the flip-flops 174 through 176 enable a number of tracks to be calculated. This track number, for each possible combination of input signals, is stored at location in the ROM 172 having addresses corresponding to the various conditions. When the SECT TIME signal shifts to a non-asserted level at the end of the sector time, an overriding loading signal is removed from a count read-only memory decoder 182. The number represents the number of tracks traversed through the end of the sector time. The decoder 182 is a counter having a modulus determined by a feedback circuit including an OR gate 183. The modulus corresponds to the maximum number of tracks that can be traversed between successive servo spaces. Once the loading signal is removed, the decoder 182 responds to each 1 MHZ pulse by generating one CNT PLS pulse that decrements the track difference counter 114 in FIG. 6. As previously indicated, the termination of the SECT TIME signal also loads the current E1 and E2 signals into the latches 180 and 181 to serve as the E1 HELD and E2 HELD signals when the next servo area passes the heads.

If, during a counting operation, the track difference counter reaches zero, the trailing edge of the CNT PLS pulse that reduces the difference to zero causes the counter 114 to generate the BR signal thereby energizing an OR gate 184 or 186, depending upon which set of tracks is selected by the E1/E2 FOLLOW bit, thereby to inhibit any change in the E2 HELD signal. This signal is thereafter used by the seek read-only memory control 125 in FIG. 8 to establish the DIRECTION signal for controlling the inverting circuit 71 in FIG. 5 during the positioning mode.

Count logic 84 of FIG. 11 can be modified to accommodate a data disk having additional servo subsectors by adding additional flip-flops, together with the appropriate encoding logic, at the E1, E2, etc, inputs; and by adding corresponding flip-flops similar to 180 and 181 to record the previous states of the respective E inputs. Of course, additional memory space in count ROM 172 will be required. Level dector 173 may be eliminated when additional servo subsectors are employed. The additional logic herein described is not specifically shown in the drawings, as the actual design thereof is now obvious in view of the foregoing discussion.

Still referring to FIG. 8, the GUARD BAND, SIGN, E1 HELD and E2 HELD signals, together with the status signals from the memory 123 are applied to the control circuit 125. From this information, control circuit 125 retrieves the appropriate DIRECTION, VEL CMD 1, VEL CMD 2 and RESET TRK CNT signals. The VEL CMD 1 and VEL CMD 2 signals are also applied to the velocity read-only memory 120 in FIG. 6 to establish, in conjunction with signals from the track difference counter, the head velocity.

When the interface drive logic circuit 80 in FIG. 6 receives a drive command that includes a track difference, the disk drive immediately shifts to a velocity mode. The various signals then establish a characteristic initial velocity for the heads and the DC servo control circuit begins to move the heads in the proper direction. Whether the track difference counter decrements on E1 or E2, polarity changes could logically depend upon the E1/E2 FOLLOW bit. In the preferred embodiment, just prior to the initiation of a track seek or one sector pulse thereafter, a switch to E1 or E2, as appropriate, is made rather than switching at the end of a seek. As the track difference approaches zero, the velocity reduces to a low value that assures only one track at most will be crossed during the interval between the passage of successive servo areas. Thus, the memory produces 0 count outputs until one of the E2 or E1 signals changes state whereupon the last CNT PUL pulse is generated and the BR signal is asserted. Now the head is still moving toward the track, but is offset by approximately one-half track, and the circuitry shifts to a positioning mode.

During the positioning mode, either the E1 signal is used to determine a positioning error while the E2 HELD signal controls the count error signal, or the E2 signal is used to determine a positioning error while the E1 HELD signal controls the count error signal. The integration of the E1 signal initially produces a large error signal that is reduced to a null value as the read-write head is centered on the track. At this point, the composite RS' has a 50% duty cycle and produces equal, but opposite, alternate integrations. Thereafter, the E1 signals are used to maintain the correct position. The relative direction of any deviation of the head from the track centerline is determined by the E2 HELD signal. The E2 HELD signal remains constant. A reverse algorithm is applied when the E1 and E2 polarity signals are treated in reverse order.

From the foregoing arrangement, it will be apparent that there has been disclosed a transducer servo mechanism which accurately locates reading and writing heads over individual tracks in a disk drive unit by using in-data servo information in two angularly displaced sets of radially adjacent blocks. The radially adjacent blocks containing recordings of asymmetrical, complementary, time displaced signals that all can be recorded at the same frequency. Thus, the servo information is easily recorded. As this servo information, together with a velocity signal if employed, accurately indicates a number of tracks that may have been passed across during successive sample intervals, it is not necessary to limit head travel to one track per interval. Thus, more rapid seeking operations can be performed. Moreover, the circuitry for seeking and for positioning the heads is essentially the same so added specialized circuitry found in some prior disk drives is eliminated. In this embodiment the velocity measurements can be quite coarse, so the tachometer and the velocity detecting circuitry can be quite simple. Finally, in this embodiment, each head is selected independently, so problems of aligning the heads with each other are reduced.

In summary, the disclosed transducer system is simple, reliable and inexpensive. It will be apparent from the foregoing description, however, that there are many alternate embodiments of the specifically disclosed circuitry. Such alternate embodiments could be implemented while attaining some or all of the various advantages of this invention. Therefore, it is an object of the appended claims to cover all such variations and modifications as come within the true spirit and scope of this invention.

What we claim as new and desire to be secure by Letters Patent of the United States is:

1. A magnetic disk for a disk drive unit that is used in a secondary storage facility for a data processing system that includes magnetic disk rotating means, movable transducer means and servo controller means, said magnetic disk being adapted for mounting on the rotating means adjacent to the movable transducer means whereby the movable transducer means generates read signals in response to recordings on the disk surface, said magnetic disk comprising:
   A. a plurality of data sectors,
      (1) each data sector spanning an angular portion of the disk spaced apart from other data sectors, and
      (2) disposed within said data sectors, at least two radially interleaved sets of data tracks centered on corresponding circular track centerlines,
   B. a plurality of servo sectors alternating with said data sectors, each servo sector including at least two sets of servo information blocks which are circumferentially spaced from each other and each of which contains first and second assymmetrical, time-displaced complementary zero information signals recorded alternately in radially adjacent servo information blocks, the phase boundaries of the servo information signals in radially adjacent blocks defining the respective sets of said circular track centerlines, and
   C. sector indicia means for indicating the angular location of said servo sectors whereby the servo controller means is responsive to the read signals produced by the recordings in said servo sectors for locating said movable transducer means with respect to said data tracks.

2. A magnetic disk as recited in claim 1 further including:
   D. an outer guard band comprising plural information tracks disposed in said servo sectors about the outer periphery of said magnetic disk and includes in radially successive tracks said first asymmetrical, time displaced, complementary signal, and
   E. an inner guard band comprising plural information tracks disposed in said servo sectors about the inner periphery of said magnetic disk and include in radially successive tracks said second asymmetrical, time displaced, complementary signal.

3. A magnetic disk as recited in claim 2 having two sets of servo information blocks and two sets of concentric data tracks, the boundaries between adjacent blocks of said first set of servo information blocks being aligned with said first set of data track centerlines and the boundaries between adjacent blocks of said second set of servo information blocks being aligned with said second set of data track centerlines.

4. A magnetic disk as recited in claim 3 wherein the disk drive unit additionally includes second transducer means for identifying said servo sectors and said sector indicia means includes a sector disk affixed to said magnetic disk for rotation therewith, said sector disk having indicia means disposed about the periphery thereof aligned with each said servo sector, the passage of said indicia means pass said second transducer means being operative to cause the generation of sector signals.

5. A magnetic disk as recited in claim 4 wherein said first and second asymmetrical, time displace, complementary signals comprise first and second square waves signals having respective duties cycles of approximately 67 percent and 33 percent.

6. A disk drive unit for use in a secondary storage facility in a data processing system, said disk drive unit comprising:
   A. a magnetic disk including
      i. a plurality of data sectors,
         (a) each data sensor spanning an angular portion of the disk spaced apart from other data sectors, and
         (b) disposed within said data sectors, at least two radially interleaved sets of data tracks centered on corresponding circular track centerlines,
      ii. a plurality of servo sectors alternating with said data sectors, each servo sector including at least two sets of servo information blocks which are circumferentially spaced from each other and each of which contains first and second assymmetrical, time-displaced complementary servo information signals recorded alternately in radially adjacent servo information blocks, the phase boundaries of the servo information signals in radially adjacent blocks defining the respective sets of said circular track centerlines, and
      iii. sector indicia means for indicating the angular location of said data sectors and said servo sectors,
   B. means for rotating said magnetic disk,
   C. movable transducer means positioned adjacent a surface of the magnetic disk for generating read signals in response to recordings in said servo sectors of said data disk, and
   D. servo controller means connected to said movable transducer means and said sector indicia means being responsive to the read signals generated by the recordings in said servo sector for positioning said movable transducer means over a preselected data track in said data sector.

7. A disk drive unit as recited in claim 6 wherein said magnetic disk includes two sets of servo information blocks and two sets of concentric data tracks, the boundaries between adjacent blocks of said first set of servo information blocks being aligned with said first set of data track centerlines and the boundaries between adjacent blocks of said second set of servo information blocks being aligned with said second set of data track centerlines.

8. A disk drive unit as recited in claim 6 wherein said servo controller means includes:
   i. means for selecting one of said sets of servo information blocks,
   ii. means for detecting the phase boundaries of the servo signals in said selected set of servo information blocks,
   iii. servo error means enabled by said sector indicia means for generating a servo error signal that is proportional to the radial displacement between said movable transducer means and said preselected data track, said error signal being generated while a servo sector passes said movable transducer means, and
   iv. servo control means connected to said servo error means being responsive to said error signal to energize said movable transducer means thereby to position said movable transducer means over said preselected data track.

9. A disk drive unit as recited in claim 6 wherein said servo controller means futher includes:
   i. track difference means for storing track displacement information corresponding to the number of data tracks between said preselected data track and said movable transducer means,
   ii. velocity signal means responsive to said track difference difference means for controlling the movement of the movable transducer means, and
   iii. updating means responsive to read signals generated by said transducer means during the movement of thereof across said servo sectors between adjacent data sectors for updating information stored in said track difference means.

* * * * *